United States Patent
Nishio et al.

(10) Patent No.: US 11,728,953 B2
(45) Date of Patent: *Aug. 15, 2023

(54) REFERENCE SIGNAL RECEPTION AND CQI COMPUTATION METHOD AND WIRELESS COMMUNICATION APPARATUS

(71) Applicant: Sun Patent Trust, New York, NY (US)

(72) Inventors: Akihiko Nishio, Osaka (JP); Seigo Nakao, Osaka (JP); Daichi Imamura, Saitama (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,297

(22) Filed: Jun. 23, 2022

(65) Prior Publication Data

US 2022/0321309 A1    Oct. 6, 2022

Related U.S. Application Data

(63) Continuation of application No. 17/169,106, filed on Feb. 5, 2021, now Pat. No. 11,398,891, which is a
(Continued)

(30) Foreign Application Priority Data

Jan. 29, 2009    (JP) .................. 2009-018284

(51) Int. Cl.
*H04L 5/00* (2006.01)
*H04W 72/0446* (2023.01)
(Continued)

(52) U.S. Cl.
CPC .......... *H04L 5/0057* (2013.01); *H04L 1/1812* (2013.01); *H04L 5/005* (2013.01);
(Continued)

(58) Field of Classification Search
CPC ... H04W 36/18; H04W 84/12; H04W 36/023; H04W 36/0016; H04W 36/08
See application file for complete search history.

(56) References Cited

U.S. PATENT DOCUMENTS 8,059,611 B2 * 11/2011 Ishii ............... H04L 5/0058
370/208
8,300,658 B2 * 10/2012 Buckley ........... H04L 27/2613
370/473
(Continued)

FOREIGN PATENT DOCUMENTS

JP    2007-214823 A    8/2007
JP    2008-054125 A    3/2008
(Continued)

OTHER PUBLICATIONS

3GPP TS 36.211 V8.2.0, 3rd Generation Partnership Project; Technical Specification Group Radio Access Network; Evolved Universal Terrestrial Radio Access (E-UTRA); Physical layer procedures (Release 8), Mar. 2008, 65 pages.
(Continued)

*Primary Examiner* — Hashim S Bhatti
(74) *Attorney, Agent, or Firm* — Seed IP Law Group LLP

(57) ABSTRACT

A wireless communication base station apparatus which is able to prevent deterioration in the throughput of LTE terminals even when LTE terminals and LTE+ terminals coexist. In this apparatus, based on the mapping pattern of the reference signals used only in LTE+ terminals, a setting unit sets, in each subframe, the resource block groups where the reference signals used only by the LTE+ terminals are mapped. For symbols mapped to the antennas, an mapping unit maps, to all the resource blocks within one frame, cell specific reference signals used for both LTE terminals and LTE+ terminals. For the symbols mapped to the antennas, the mapping unit maps, to the plurality of resource blocks,
(Continued)

of which part of the resource block groups is comprised, in the same subframe within one frame, the cell specific reference signals used only for LTE+ terminals, based on the setting results inputted from the setting unit.

13 Claims, 24 Drawing Sheets

Related U.S. Application Data continuation of application No. 16/716,094, filed on Dec. 16, 2019, now Pat. No. 10,958,403, which is a continuation of application No. 16/218,257, filed on Dec. 12, 2018, now Pat. No. 10,547,433, which is a continuation of application No. 15/673,090, filed on Aug. 9, 2017, now Pat. No. 10,193,679, which is a continuation of application No. 15/372,113, filed on Dec. 7, 2016, now Pat. No. 9,762,370, which is a continuation of application No. 15/264,219, filed on Sep. 13, 2016, now Pat. No. 9,548,849, which is a continuation of application No. 14/602,176, filed on Jan. 21, 2015, now Pat. No. 9,473,282, which is a continuation of application No. 13/144,665, filed as application No. PCT/JP2010/000499 on Jan. 28, 2010, now Pat. No. 8,996,049.

(51) Int. Cl.
| | | |
|---|---|---|
| *H04W 72/23* | (2023.01) | |
| *H04L 1/1812* | (2023.01) | |
| *H04B 7/06* | (2006.01) | |
| *H04W 72/54* | (2023.01) | |

(52) U.S. Cl.
CPC .......... *H04L 5/0028* (2013.01); *H04L 5/0051* (2013.01); *H04L 5/0073* (2013.01); *H04W 72/0446* (2013.01); *H04W 72/23* (2023.01); *H04B 7/0632* (2013.01); *H04L 5/0012* (2013.01); *H04L 5/0041* (2013.01); *H04L 5/0082* (2013.01); *H04W 72/54* (2023.01)

(56) References Cited

U.S. PATENT DOCUMENTS

| | | | |
|---|---|---|---|
| 8,301,951 B2 | 10/2012 | Miki et al. | |
| 8,315,225 B2 * | 11/2012 | Xu | H04L 5/005 |
| | | | 370/330 |
| 8,320,263 B2 | 11/2012 | Kurose et al. | |
| 8,654,747 B2 * | 2/2014 | Taoka | H04W 72/1215 |
| | | | 370/348 |
| 2008/0049813 A1 | 2/2008 | Kurose et al. | |
| 2008/0232396 A1 * | 9/2008 | Buckley | H04L 27/2613 |
| | | | 370/465 |
| 2009/0176463 A1 | 7/2009 | Raaf et al. | |
| 2009/0217118 A1 | 8/2009 | Miki et al. | |
| 2009/0252077 A1 * | 10/2009 | Khandekar | H04L 5/0023 |
| | | | 370/312 |
| 2010/0074209 A1 * | 3/2010 | Montojo | H04W 72/542 |
| | | | 455/501 |
| 2010/0097972 A1 | 4/2010 | Parkvall et al. | |
| 2010/0150090 A1 * | 6/2010 | Park | H04L 1/0067 |
| | | | 370/329 |
| 2010/0177807 A1 | 7/2010 | Zhang et al. | |
| 2011/0170475 A1 | 7/2011 | Raaf | |
| 2011/0317581 A1 * | 12/2011 | Hoshino | H04L 5/0082 |
| | | | 370/252 |

FOREIGN PATENT DOCUMENTS

| | | |
|---|---|---|
| WO | 2004/084450 A2 | 9/2004 |
| WO | 2008/115134 A2 | 9/2008 |

OTHER PUBLICATIONS

3GPP TS 36.213 V8.2.0, 3rd Generation Partnership Project; Technical Specification Group Radio Access Network; Evolved Universal Terrestrial Radio Access (E-UTRA); Physical layer procedures (Release 8), Mar. 2008, 30 pages.
36.211 CR 0085, V8.4.0, "CR clarifying the use of UE-specific reference signals in the presense of PBCH, PSS, and SSS," R1-083845, 3GPP TSG-RAN WG1 #54bis, Prague, Czech Republic, Sep. 29-Oct. 3, 2008, 3 pages.
Catt, "RS design for DL higher order MIMO in LTE-A," R1-090481, 3GPP TSG RAN WG1 meeting 55bis, Agenda Item: 12.5, Ljubljana, Slovenia, Jan. 12-26, 2009, 8 pages.
English Translation of Chinese Search Report, dated Aug. 22, 2018, for the corresponding Chinese Patent Application No. 201510977423.3, 2 pages.
English Translation of Russian Office Action dated Mar. 26, 2014, for corresponding RU Patent Application No. 2011131777/07(046818), 4 pages.
ETRI, "Common reference signal structure for 8 transmit antennas," 3GPP TSG RAN WG1 Meeting #55, R1-084145, Prague, Czech Republic, Nov. 10-Nov. 14, 2008, 3 pages.
Extended European Search Report dated Aug. 4, 2015, for corresponding EP Application No. 10735648,7-1851 / 2383918, 8 pages.
International Search Report dated Feb. 23, 2010, for corresponding International Application No. PCT/JP2010/000499, 3 pages.
LG Electronics, "Downlink Reference Signal for Higher Order MIMO," R1-090218, 3GPP TSG RAN WG1 Meeting #55bis, Agenda Item: 12.5, Ljubljana, Slovenia, Jan. 12-17, 2009, 7 pages.
Nortel, "Design Aspect for Higher-order MIMO in LTE-advanced," R1-084466, 3GPP TSG-RAN Working Group 1 Meeting #55, Agenda Item: 11.3, Prague, Czech Rep, Nov. 10-14, 2008, 8 pages.
NTT Docomo, "Support of DL Higher-Order MIMO Transmission in LTE-Advanced," 3GPP TSG RAN WG1 Meeting #55bis, R1-090317, Ljubljana, Slovenia, Jan. 12-Jan. 16, 2009, 9 pages.
Philips, Qualcomm, and Alcatel-Lucent, "High-Level Principles for CSI feedback for DL MIMO and COMP in LTE-A," 3GPP TSG RAN WG1 Meeting #57, RI-091722, San Francisco, USA, May 4-May 8, 2009, 2 pages.
Qualcomm Europe, "Aspects to consider for DL transmission schemes of LTE-A," R1-090365, 3GPP TSG-RAN WG1 #55bis, Agenda Item: 12.5, Ljubljana, Slovenia, Jan. 12-16, 2009, 3 pages.
Samsung, "Issues on DL RS Design for Higher Order MIMO," R1-084169, 3GPP TSG RAN WG1 #55, Agenda Item: 11.3, Prague, Czech Republic, Nov. 10-14, 2008, 3 pages.
Samsung ,"Discussions on DL RD Design on Higher Order MIMO," R1-090103, Agenda Item: 12.5, 3GPP TSG RAN WG1 #55bis, Ljubljana, Slovenia, Jan. 12-16, 2009, 3 pages.
Sharp, "Backward compatible design of downlink reference signals in LTE-Advanced," 3GPP TSG RAN WG1 Meeting #55bis, R1-090023, Ljubljana, Slovenia, Jan. 12-Jan. 16, 2009, 6 pages.
Texas Instruments, "Common Reference Symbol Mapping/Signaling for 8 Transmit Antenna," 3GPP TSG RAN WG1 Meeting #55bis, R1-090288, Ljubljana, Slovenia, Jan. 12-Jan. 16, 2009, 8 pages.

\* cited by examiner

REFERENCE SIGNAL RECEPTION AND CQI COMPUTATION METHOD AND WIRELESS COMMUNICATION APPARATUS

TECHNICAL FIELD

The present invention relates to a reference signal mapping method and radio communication base station apparatus.

BACKGROUND ART

3GPP-LTE adopts OFDMA (Orthogonal Frequency Division Multiple Access) as a downlink communication scheme. According to 3GPP-LTE, a radio communication base station apparatus (hereinafter abbreviated as "base station") transmits reference signals (RSs) using predetermined communication resources and a radio communication terminal apparatus (hereinafter abbreviated as "terminal") performs channel estimation using the received reference signals and demodulates data (see non-patent literature 1). Furthermore, using reference signals, the terminal performs measurement of receiving quality for adaptive MCS (Modulation and channel Coding Scheme) control, for PMI (Precoding Matrix Indicator) control in MIMO (Multiple-Input Multiple-Output) transmission or for adaptive scheduling. The terminal then feeds back the obtained PMI and receiving quality information (CQI: Channel Quality Indicator) to the base station.

Furthermore, when the base station is provided with a plurality of antennas, the base station can perform diversity transmission. For example, the base station can realize high-speed transmission by transmitting a plurality of data streams from a plurality of antennas (MIMO transmission). In order for the terminal to receive the signal transmitted with diversity without errors, the terminal has to know a channel condition from a plurality of antennas used for transmission by the base station to the terminal. Therefore, RSs need to be transmitted from all antennas provided for the base station without interference with each other. To realize this, 3GPP-LTE employs a method of transmitting RS from each antenna of the base station using timings and carrier frequencies different from each other in the time domain and frequency domain.

FIG. 1 shows a configuration of a 4-antenna base station (4Tx base station) envisioned by 3GPP-LTE and FIG. 2 shows an RS transmission method by the 4Tx base station (see non-patent literature 2). Here, in FIG. 2, the vertical axis (frequency domain) corresponds to a subcarrier unit and the horizontal axis (time domain) corresponds to an OFDM symbol unit. Furthermore, R0, R1, R2 and R3 represent RSs transmitted from antennas 0, 1, 2 and 3 (first, second, third and fourth antennas) respectively. Furthermore, in FIG. 2, a unit of one block enclosed by a thick line frame (six subcarriers in the frequency domain and fourteen OFDM symbols in the time domain) is called "resource block (RB)." Though one RB is comprised of 12 subcarriers according to 3GPP-LTE, it is assumed here that the number of subcarriers, of which one RB is comprised, is six for ease of explanation. Furthermore, a unit of 1 subcarrier×1 OFDM symbol, of which one RB is comprised, is called "resources element (RE)." As is clear from FIG. 2, the 4Tx base station reduces transmission frequencies of RSs (R2 and R3) from antenna 2 (third antenna) and antenna 3 (fourth antenna) to minimize overhead involved in RS transmission.

The RSs shown in FIG. 2 are common to all terminals in a cell covered by the base station and are called "cell-specific RSs (cell-specific reference signals)." Furthermore, the base station may also additionally transmit RSs (terminal-specific RSs (UE specific reference signals)) multiplied by a weight specific to each terminal for beam forming transmission.

As described above, the number of antennas of a base station according to 3GPP-LTE is a maximum of four and a 3GPP-LTE-compliant terminal demodulates data and measures quality of a downlink signal using RSs (R0 to R3 shown in FIG. 2) transmitted from a base station (4Tx base station) provided with a maximum of four antennas.

By contrast, LTE-advanced which is an evolved version of 3GPP-LTE is studying a base station equipped with a maximum of 8 antennas (8Tx base station). However, LTE-advanced is also required to provide a 3GPP-LTE-compliant base station to enable terminals compliant with only a 3GPP-LTE base station (4Tx base station) to communicate. In other words, LTE-advanced is required to accommodate both terminals compliant with only a 4Tx base station (hereinafter referred to as "LTE terminals") and terminals also compliant with an 8Tx base station (hereinafter referred to as "LTE+ terminals").

CITATION LIST

Non-Patent Literature

NPL 1
3GPP TS 36.213 V8.2.0
(ftp://ftp.3gpp.org/specs/2008-03/Rel-8/36_series/36213-820.zip)
NPL 2
3GPP TS 36.211 V8.2.0
(ftp://ftp.3gpp.org/specs/2008-03/Rel-8/36_series/36211-820.zip)

SUMMARY OF INVENTION

Technical Problem

In LTE-advanced, in order for LTE+ terminals to receive a diversity-transmitted signal without errors, the base station has to transmit RSs corresponding to 8 antennas. For example, as shown in FIG. 3, R0 to R7, which are RSs corresponding to 8 antennas may be mapped to all RBs. This allows LTE+ terminals to receive the signal without errors. Moreover, terminals can obtain CQI and PMI of each antenna in sub-frame units, and can thereby improve throughput by means of MIMO transmission.

However, LTE terminals grasp only mapping positions of RSs (R0 to R3) shown in FIG. 2. That is, LTE terminals do not know the presence of RSs used only for LTE+ terminals—that is, R4 to R7 shown in FIG. 3. Therefore, in REs to which RSs (R4 to R7) used only for LTE+ terminals are mapped, LTE terminals receive signals recognizing that data signals have been mapped. Thus, when LTE terminals and LTE+ terminals coexist, LTE terminals may not be able to correctly receive signals. As a result, the error rate characteristics and throughput of LTE terminals deteriorate.

It is therefore an object of the present invention to provide a reference signal mapping method and radio communication base station apparatus capable of preventing deterioration in the throughput of LTE terminals even when LTE terminals and LTE+ terminals coexist.

Solution to Problem

The reference signal mapping method of the present invention maps a first reference signal used for both a first radio communication terminal apparatus corresponding to a radio communication base station apparatus provided with N antennas and a second radio communication terminal apparatus corresponding to a radio communication base station apparatus provided with more than N antennas to all resource blocks in one frame, and maps a second reference signal used only for the second radio communication terminal apparatus to a plurality of resource blocks, of which part of resource block groups is comprised, in the same sub-frame in one frame.

The radio communication base station apparatus of the present invention is a radio communication base station apparatus that transmits a first reference signal used for both a first radio communication terminal apparatus corresponding to a radio communication base station apparatus provided with N antennas and a second radio communication terminal apparatus corresponding to a radio communication base station apparatus provided with more than N antennas, and a second reference signal used only for the second radio communication terminal apparatus, and comprises a setting section that sets resource blocks to which the second reference signal is mapped per sub-frame based on an mapping pattern of the second reference signal and an mapping section that maps the first reference signal to all resource blocks in one frame and maps the second reference signal to a plurality of resource blocks, of which part of resource block groups is comprised, in the same sub-frame in one frame.

Advantageous Effects of Invention

Even when LTE terminals and LTE+ terminals coexist, the present invention can prevent deterioration in the throughput of LTE terminals.

DESCRIPTION OF EMBODIMENTS

Hereinafter, embodiments of the present invention will be described in detail with reference to the accompanying drawings. In the following descriptions, a base station is provided with eight antennas and transmits transmission data to LTE terminals and LTE+ terminals. Furthermore, one frame is divided into a plurality of sub-frames. Furthermore, a plurality of subcarriers of one sub-frame are divided into a plurality of RBs. That is, one RB is comprised of some subcarriers of one sub-frame.

Embodiment 1

Figure 1:
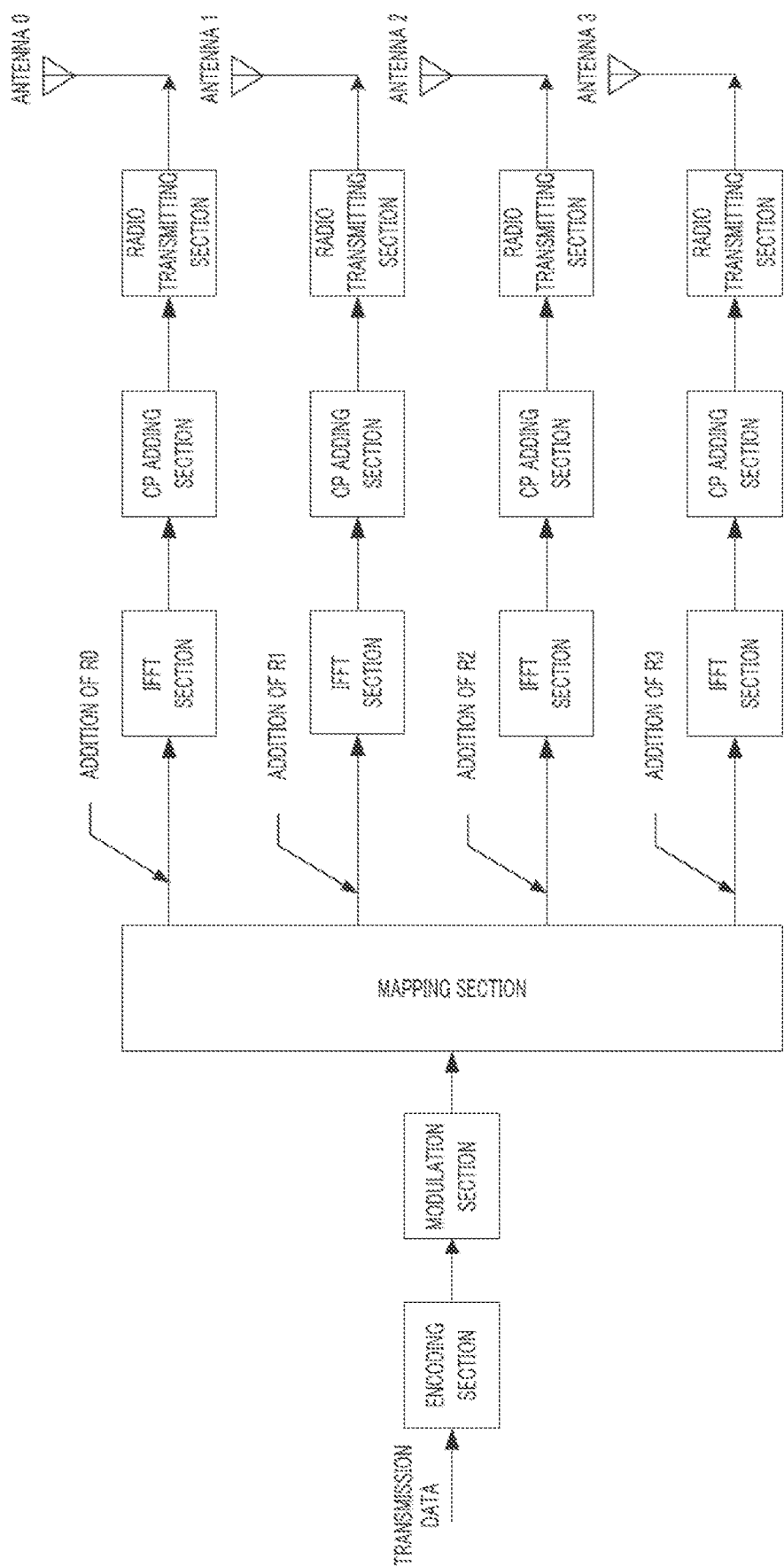
FIG. 1 is a block diagram illustrating a configuration of a conventional 4Tx base station.
Figure 2:
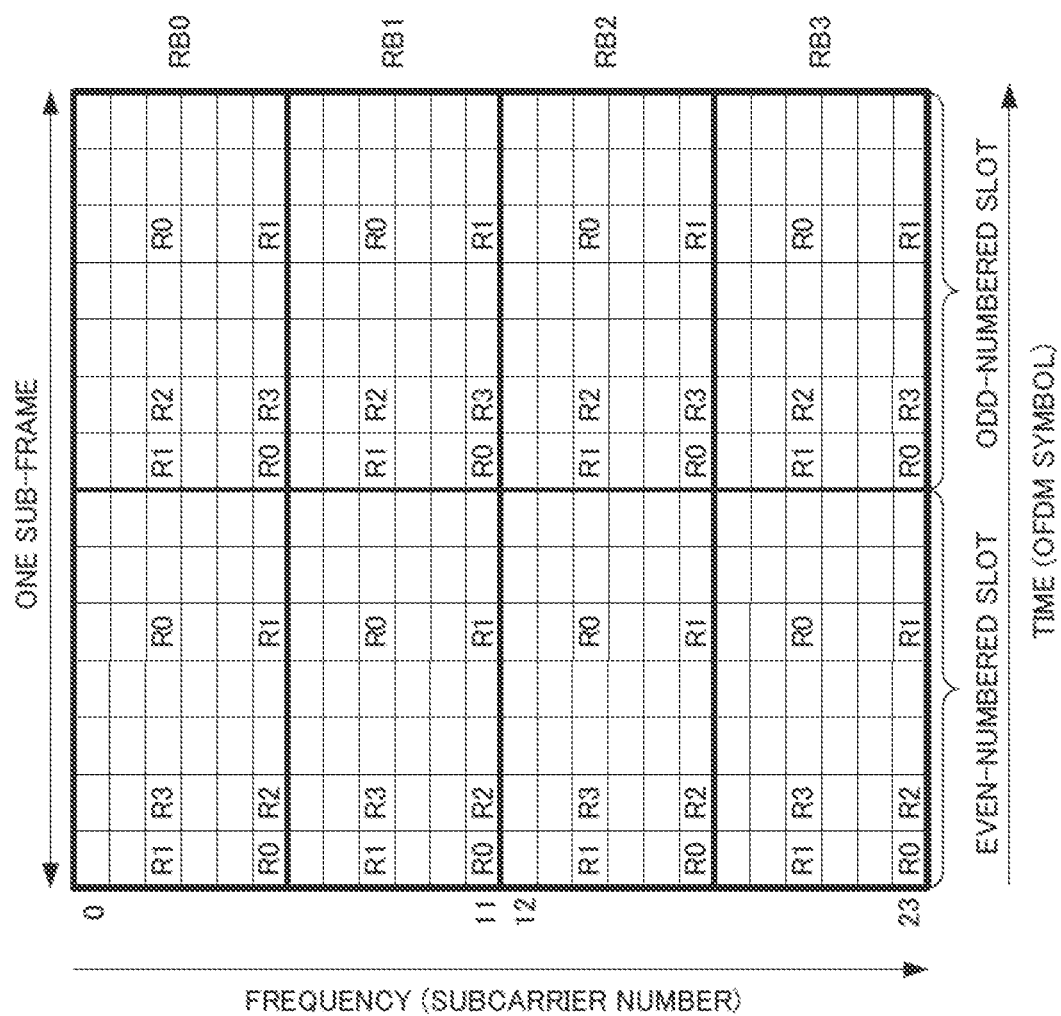
FIG. 2 shows an RS transmission method by a conventional 4Tx base station.
Figure 3:
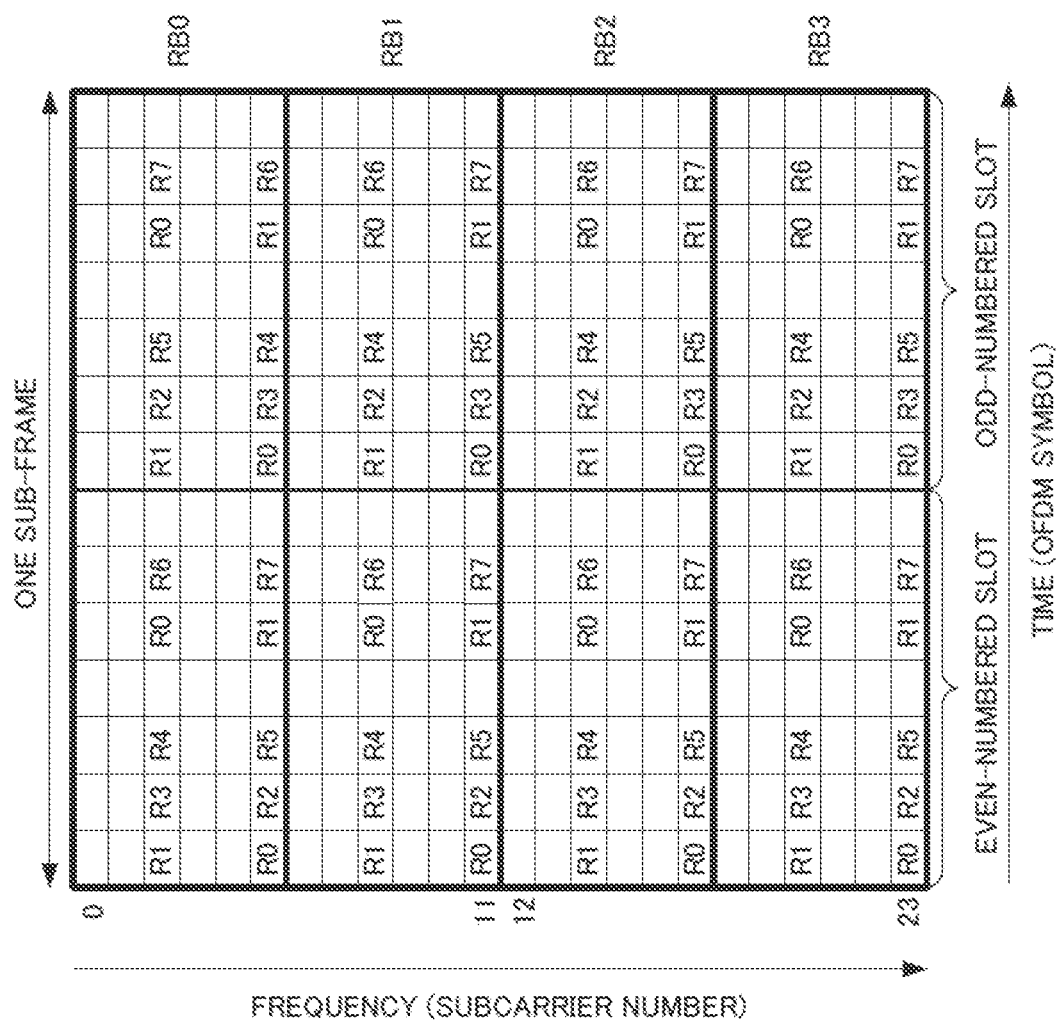
FIG. 3 shows an RS transmission method by a conventional 8Tx base station.
Figure 4:
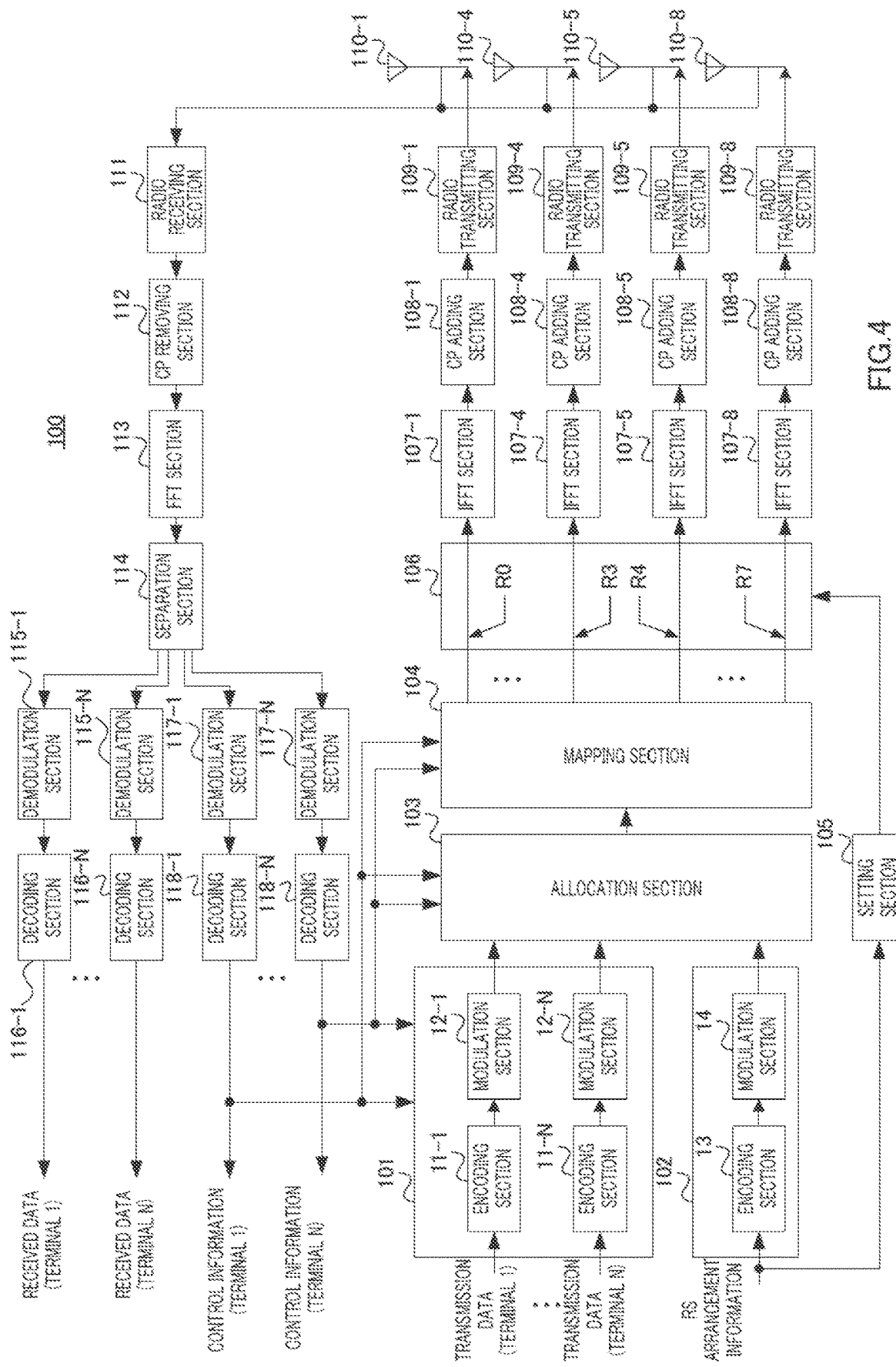
FIG. 4 is a block diagram illustrating a configuration of a base station according to Embodiment 1 of the present invention.

A configuration of base station 100 according to the present embodiment is shown in FIG. 4.

Encoding/modulation section 101 of base station 100 is provided with as many encoding sections 11 and modulation sections 12 for transmission data as N, the number of terminals with which base station 100 can communicate. In encoding/modulation section 101, encoding sections 11-1 to 11-N perform encoding processing on transmission data of terminals 1 to N and modulation sections 12-1 to 12-N perform modulation processing on encoded transmission data and generate data symbols. Encoding/modulation section 101 determines respective coding rates and modulation schemes (that is, MCS) of encoding sections 11 and modulation sections 12 based on CQI information inputted from decoding sections 118-1 to 118-N.

In encoding/modulation section 102, encoding section 13 performs encoding processing on information indicating an mapping pattern of cell-specific RSs used only for LTE+ terminals (RS mapping information) and modulation section 14 performs modulation processing on the encoded RS mapping information and generates RS mapping information symbols. Here, base station 100 may broadcast the RS mapping information to all LTE+ terminals in a cell covered by base station 100 using a BCH (Broadcast Channel) signal.

Allocation section 103 allocates data symbols and RS mapping information symbols to each subcarrier constituting an OFDM symbol according to the CQI information inputted from decoding sections 118-1 to 118-N and outputs the allocated symbols to mapping section 104.

Mapping section 104 maps the respective symbols inputted from allocation section 103 to antennas 110-1 to 110-8. Furthermore, mapping section 104 selects a precoding vector used for each antenna based on the PMI information inputted from decoding sections 118-1 to 118-N. Mapping section 104 multiplies the symbol mapped to each antenna by the selected precoding vector. Mapping section 104 then outputs the symbol mapped to each antenna to mapping section 106.

Setting section 105 sets RBs to which cell-specific RSs (R4 to R7) transmitted from antennas 110-5 to 110-8 are mapped per sub-frame based on the RS mapping information. To be more specific, setting section 105 sets RBs to which cell-specific RSs are mapped per sub-frame based on the mapping pattern indicating mapping positions of cell-specific RSs (R4 to R7) used only for LTE+ terminals. Here, according to the mapping pattern used by setting section 105, cell-specific RSs (R0 to R3) used for both LTE terminals and LTE+ terminals are mapped to all RBs in one frame and cell-specific RSs (R4 to R7) used only for LTE+ terminals are mapped to part of RBs in one frame. Setting section 105 outputs the setting result to mapping section 106.

Mapping section 106 adds cell-specific RSs (R0 to R7) to symbols inputted from mapping section 104 and mapped to the respective antennas. To be more specific, in the symbols mapped to antennas 110-1 to 110-4, mapping section 106 maps cell-specific RSs (R0 to R3) used for both LTE terminals and LTE+ terminals to all RBs in one frame. On the other hand, in the symbols mapped to antennas 110-5 to 110-8, mapping section 106 maps cell-specific RSs (R4 to R7) used only for LTE+ terminals to the set part of RBs based on the setting result inputted from setting section 105. Furthermore, when transmission data directed to LTE+ terminals are allocated to RBs other than RBs indicated in the setting result inputted from setting section 105, mapping section 106 maps terminal-specific RSs to RBs. For example, mapping section 106 uses R4 to R7 as terminal-specific RSs. Mapping section 106 may also use R4 to R7 multiplied by terminal-specific weights. Mapping section 106 outputs the symbol sequence, to which the RS is mapped, to IFFT (Inverse Fast Fourier Transform) sections 107-1 to 107-8.

IFFT sections 107-1 to 107-8, CP (Cyclic Prefix) adding sections 108-1 to 108-8 and radio transmitting sections 109-1 to 109-8 are provided in association with respective antennas 110-1 to 110-8.

IFFT sections 107-1 to 107-8 perform IFFT on a plurality of subcarriers constituting RBs to which symbols are allocated and generate OFDM symbols which are multicarrier signals. IFFT sections 107-1 to 107-8 then output the OFDM symbols generated to CP adding sections 108-1 to 108-8 respectively.

CP adding sections 108-1 to 108-8 add the same signal as that at the rear end of an OFDM symbol to the head of the OFDM symbol as a CP.

Radio transmitting sections 109-1 to 109-8 perform transmission processing such as D/A conversion, amplification and up-conversion on the OFDM symbols with the CP added and transmit the OFDM symbols from antennas 110-1 to 110-8 to the respective terminals. That is, base station 100 transmits a plurality of data streams from antennas 110-1 to 110-8.

On the other hand, radio receiving section 111 receives N signals simultaneously transmitted from a maximum of N terminals via antennas 110-1 to 110-8 and performs receiving processing such as down-conversion, A/D conversion on the signals.

CP removing section 112 removes CPs from the signals after the receiving processing.

FFT (Fast Fourier Transform) section 113 performs FFT on the signals with the CPs removed and obtains terminal-specific signals multiplexed in the frequency domain. Here, each terminal-specific signal includes a data signal of each terminal and control information including CQI information and PMI information of each terminal.

Separation section 114 separates the signal of each terminal inputted from FFT section 113 into data signals and control information of each terminal. Separation section 114 outputs data signals of terminals 1 to N to demodulation sections 115-1 to 115-N respectively and outputs control information of terminals 1 to N to demodulation sections 117-1 to 117-N respectively.

Base station 100 is provided with as many demodulation sections 115-1 to 115-N, decoding sections 116-1 to 116-N, demodulation sections 117-1 to 117-N and decoding sections 118-1 to 118-N as N, the number of terminals with which base station 100 can communicate.

Demodulation sections 115-1 to 115-N perform demodulation processing on the data signals inputted from separation section 114 and decoding sections 116-1 to 116-N perform decoding processing on the demodulated data signals. This allows terminal-specific received data to be obtained.

Demodulation sections 117-1 to 117-N perform demodulation processing on the control information inputted from separation section 114 and decoding sections 118-1 to 118-N perform decoding processing on the demodulated control information. Decoding sections 118-1 to 118-N output CQI information and PMI information of the control information to encoding/modulation section 101, allocation section 103 and mapping section 104.

Figure 5:
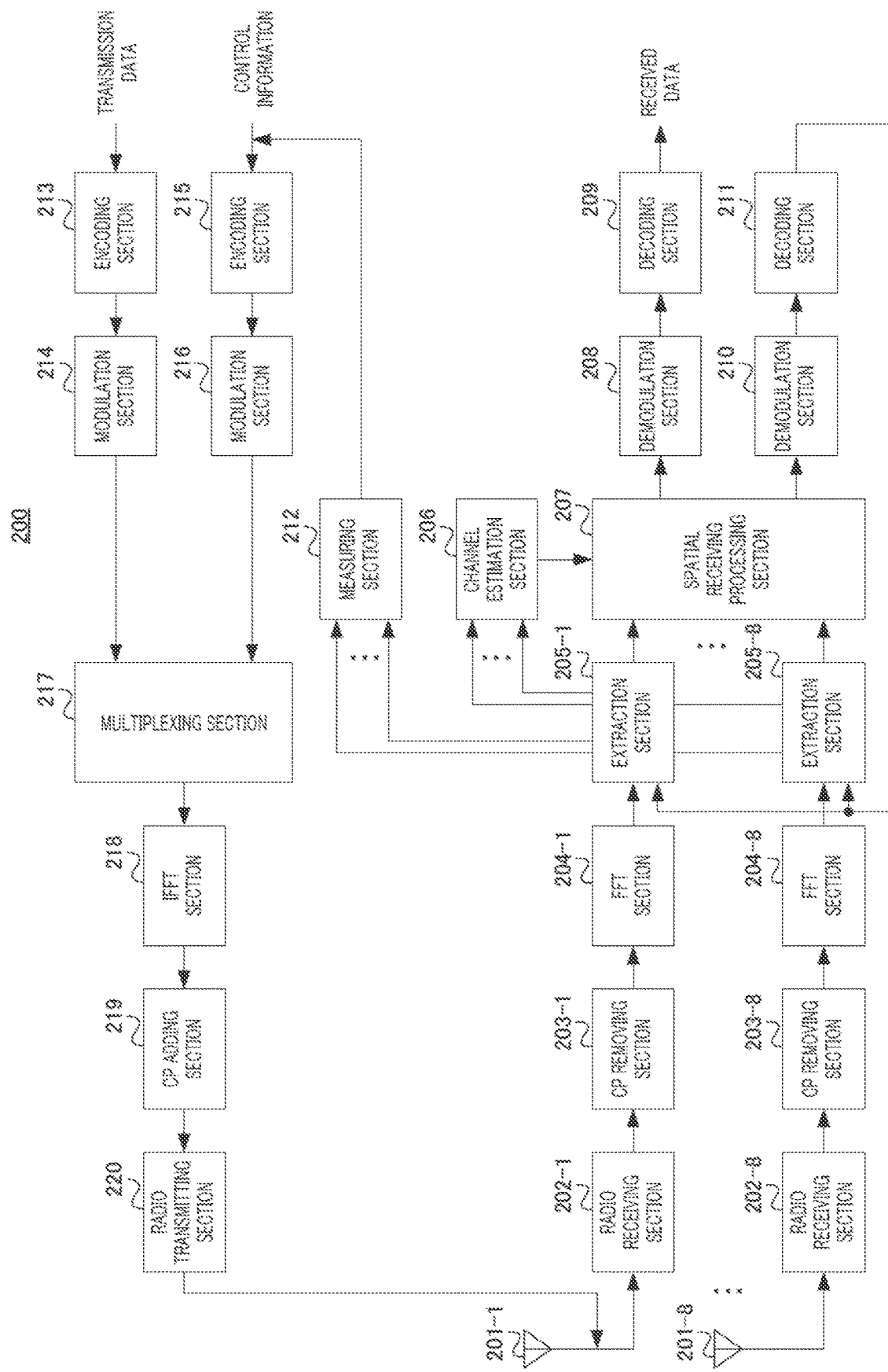
FIG. 5 is a block diagram illustrating a configuration of an LTE+ terminal according to Embodiment 1 of the present invention.

Next, terminal 200 (LTE+ terminal) according to the present embodiment will be described. FIG. 5 shows a configuration of terminal 200 according to the present embodiment.

In terminal 200 shown in FIG. 5, radio receiving sections 202-1 to 202-8, CP removing sections 203-1 to 203-8, FFT sections 204-1 to 204-8 and extraction sections 205-1 to 205-8 are provided in association with respective antennas 201-1 to 201-8.

Radio receiving sections 202-1 to 202-8 receive OFDM symbols transmitted from base station 100 (FIG. 4) via antennas 201-1 to 201-8 and perform receiving processing such as down-conversion, A/D conversion on the OFDM symbols.

CP removing sections 203-1 to 203-8 remove CPs from the OFDM symbols after the receiving processing.

FFT sections 204-1 to 204-8 perform FFT on the OFDM symbols with CP removed and obtain signals in the frequency domain.

Extraction sections 205-1 to 205-8 extract cell-specific RSs (R0 to R7) and terminal-specific RSs (e.g. R4 to R7 multiplied by terminal-specific weights) from the signals inputted from FFT sections 204-1 to 204-8 based on RS mapping information inputted from decoding section 211. Extraction sections 205-1 to 205-8 output cell-specific RSs to channel estimation section 206 and measuring section 212 and output terminal-specific RSs to channel estimation section 206. Furthermore, extraction sections 205-1 to 205-8 output the signals inputted from FFT sections 204-1 to 204-8 to spatial receiving processing section 207. Terminal 200 may also acquire RS mapping information by receiving a BCH signal included in the RS mapping information from base station 100.

Channel estimation section 206 performs channel estimation using the cell-specific RSs and terminal-specific RSs inputted from extraction sections 205-1 to 205-8 and outputs the channel estimation result to spatial receiving processing section 207.

Spatial receiving processing section 207 performs spatial receiving processing on the signals inputted from extraction sections 205-1 to 205-8—that is, the signals received from antennas 201-1 to 201-8—using the channel estimation result inputted from channel estimation section 206. Spatial receiving processing section 207 then outputs data signals of the separated data streams to demodulation section 208 and outputs RS mapping information to demodulation section 210.

Demodulation section 208 performs demodulation processing on the data signals inputted from spatial receiving processing section 207 and decoding section 209 performs decoding processing on the demodulated data signals. In this way, received data is obtained.

Demodulation section 210 performs demodulation processing on the RS mapping information inputted from spatial receiving processing section 207 and decoding section 211 performs decoding processing on the demodulated RS mapping information. Decoding section 211 then outputs the decoded RS mapping information to extraction sections 205-1 to 205-8.

On the other hand, measuring section 212 measures CQIs of antennas 201-1 to 201-8 and estimates PMIs to obtain good receiving quality using cell-specific RSs (R0 to R7) inputted from extraction sections 205-1 to 205-8. Measuring section 212 outputs CQI information indicating the measured CQIs and PMI information indicating the estimated PMI to encoding section 215 as control information.

Encoding section 213 performs encoding processing on transmission data and modulation section 214 performs modulation processing on the encoded transmission data and generates data symbols. Modulation section 214 outputs the data symbols generated to multiplexing section 217.

Encoding section 215 performs encoding processing on the control information including the CQI information and PMI information inputted from measuring section 212 and modulation section 216 performs modulation processing on the encoded control information and generates control information symbols. Modulation section 216 outputs the control information symbols generated to multiplexing section 217.

Multiplexing section 217 multiplexes the data symbols inputted from modulation section 214 and the control information symbols inputted from modulation section 216 and outputs the multiplexed signal to IFFT section 218.

IFFT section 218 performs IFFT on a plurality of subcarriers to which the signals inputted from multiplexing section 217 are allocated and outputs the signal after the IFFT to CP adding section 219.

CP adding section 219 adds the same signal as that at the rear end of the signal inputted from IFFT section 218 to the head of the signal as a CP.

Radio transmitting section 220 performs transmission processing such as D/A conversion, amplification and up-conversion on the signal with CP added and transmits the signal from antenna 201-1 to base station 100 (FIG. 4).

Next, a cell-specific RS mapping method according to the present embodiment will be described.

Figure 6:
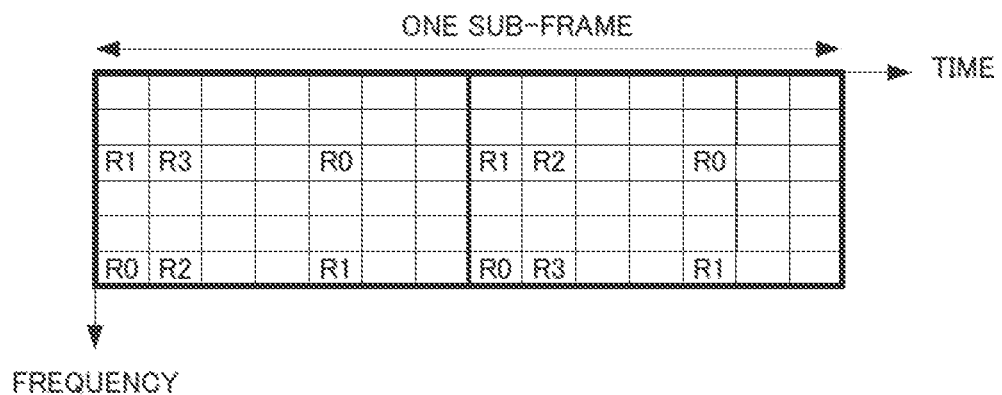
FIG. 6 shows an RB to which only RSs used for both LTE terminals and LTE+ terminals according to Embodiment 1 of the present invention are mapped.
Figure 7:
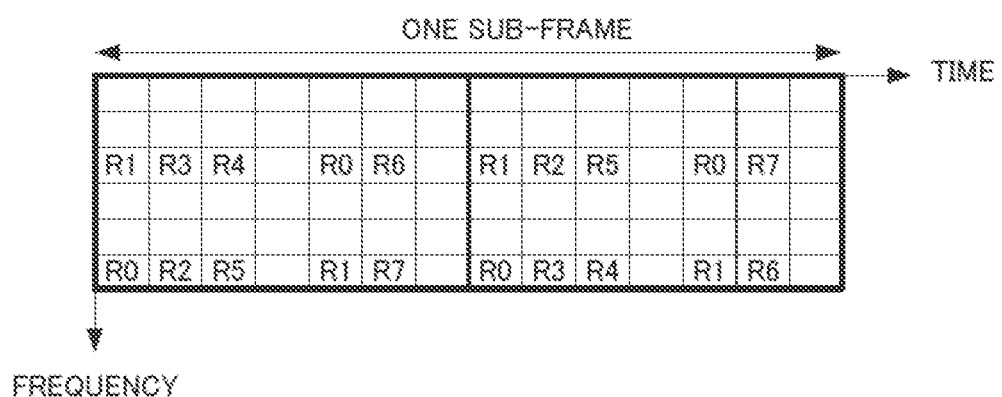
FIG. 7 shows an RB to which only RSs used for LTE+ terminals according to Embodiment 1 of the present invention are mapped.

In the following descriptions, as shown, for example, in FIG. 8, one frame is comprised of five sub-frames (sub-frames 0 to 4). Furthermore, a case will be described as an example where a plurality of subcarriers are uniformly divided into four RBs of RB0 to RB3 in one sub-frame. Furthermore, as shown in FIG. 6 and FIG. 7, one RB is comprised of six subcarriers×one sub-frame. Furthermore, cell-specific RSs (R0 to R3) used for both LTE terminals and LTE+ terminals are mapped to REs set beforehand in an RB as shown in FIG. 6 and FIG. 7. Furthermore, cell-specific RSs (R4 to R7) used only for LTE+ terminals are mapped to REs set beforehand in an RB as shown in FIG. 7.

Figure 8:
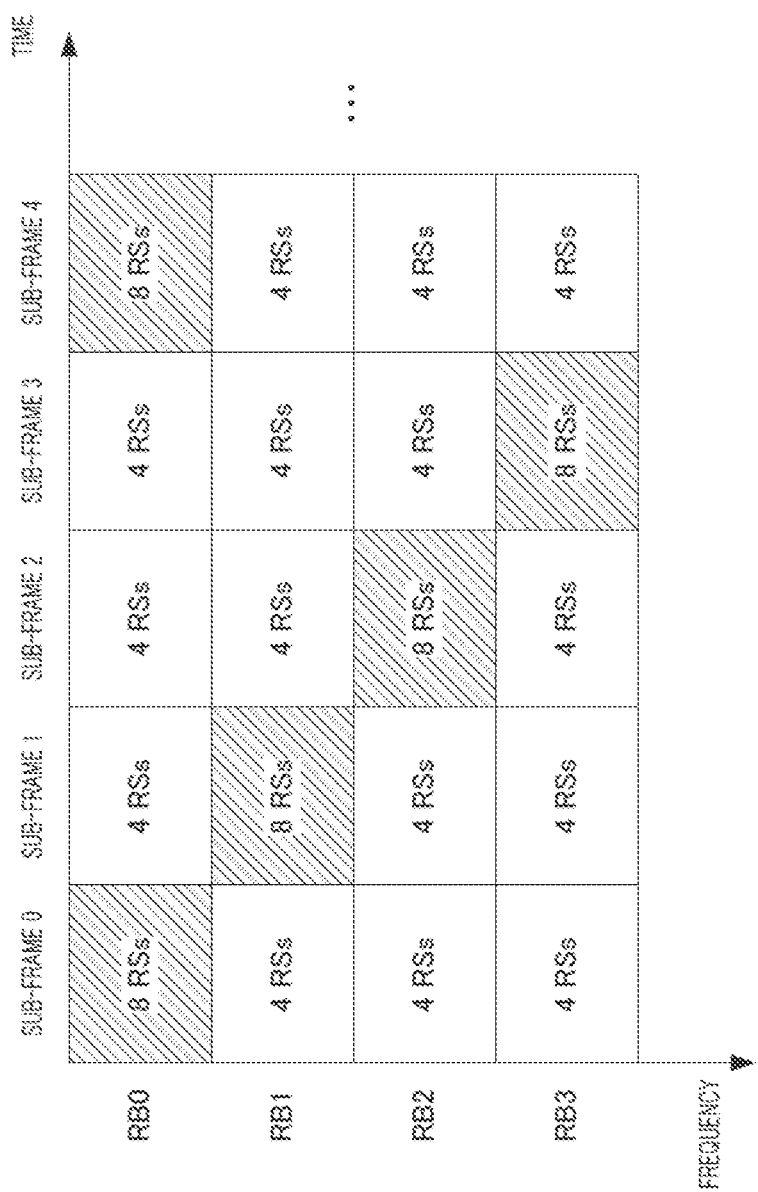
FIG. 8 shows an RS mapping pattern according to Embodiment 1 of the present invention (mapping method 1)

Furthermore, in the following descriptions, as shown in FIG. 8, RBs (FIG. 6) to which four RSs of R0 to R3 are mapped are represented by "4 RSs" and RBs (FIG. 7) to which eight RSs of R0 to R7 are mapped are represented by "8 RSs." That is, in FIG. 8, cell-specific RSs (R0 to R3) used for both LTE terminals and LTE+ terminals are mapped to all RBs in one frame, whereas RSs (R4 to R7) used only for LTE+ terminals are mapped only to RBs represented by 8 RSs.

<Mapping Method 1 (FIG. 8)>

The present mapping method maps cell-specific RSs used only for LTE+ terminals only to part of RBs in one frame.

Here, if cell-specific RSs used only for LTE+ terminals are fixedly mapped to only limited part of frequency bands in one frame, base station 100 can allocate data signals of both LTE+ terminals and LTE terminals to only limited frequency bands. For example, in sub-frame 0 to sub-frame 4 in one frame, if cell-specific RSs (R4 to R7) used only for LTE+ terminals are fixedly mapped to only RB0 and RB1 among RB0 to RB3, base station 100 can allocate data signals directed to LTE terminals to only RB2 and RB3. That is, if cell-specific RSs used only for LTE+ terminals are fixedly mapped to only limited part of frequency bands in one frame, RBs to which LTE terminals can be allocated are limited, which causes the frequency scheduling effect to deteriorate.

Thus, the present mapping method maps cell-specific RSs (R4 to R7) used only for LTE+ terminals to RBs of different frequency bands in neighboring sub-frames.

To be more specific, as shown in FIG. 8, R4 to R7 are mapped to RB0 in sub-frame 0, R4 to R7 are mapped to RB1 in sub-frame 1, R4 to R7 are mapped to RB2 in sub-frame 2, R4 to R7 are mapped to RB3 in sub-frame 3 and R4 to R7 are mapped to RB0 in sub-frame 4.

That is, as shown in FIG. 8, setting section 105 (FIG. 4) of base station 100 sets RB0 in sub-frame 0 and sets RB1 in sub-frame 1 as RBs to which cell-specific RSs (R4 to R7) used only for LTE+ terminals are mapped. The same applies to sub-frames 2 to 4 as well.

As shown in FIG. 7, mapping section 106 maps R4 to R7 to their corresponding REs in RB0 of sub-frame 0 and maps R4 to R7 to their corresponding REs in RB1 of sub-frame 1. The same applies to sub-frames 2 to 4 as well.

As shown in FIG. 8, R4 to R7 are mapped to only five RBs out of twenty RBs in one frame ("five sub-frames of sub-frames 0 to 4"ד four RBs of RB0 to 3"). That is, only R0 to R3 that can be received by LTE terminals are transmitted in fifteen RBs ("4 RSs" shown in FIG. 8) other than some RBs ("8 RSs" shown in FIG. 8) to which R4 to R7 are mapped. Thus, base station 100 can allocate LTE terminals to RBs ("4 RSs" shown in FIG. 8) other than some RBs ("8 RSs" shown in FIG. 8) to which R4 to R7 are mapped. This prevents LTE terminals from erroneously receiving REs to which R4 to R7 are mapped as data symbols and can thereby prevent deterioration of error rate characteristics.

Furthermore, as shown in FIG. 8, RBs ("8 RSs" shown in FIG. 8) to which R4 to R7 are mapped are mapped to RBs of different frequency domains in neighboring sub-frames. To be more specific, as shown in FIG. 8, R4 to R7 are mapped to RB0 in sub-frame 0, while R4 to R7 are mapped to RB1 in a frequency domain different from that of RB0 in sub-frame 1 adjacent to sub-frame 0. Similarly, R4 to R7 are mapped to RB2 in a frequency domain different from that of RB1 in sub-frame 2 adjacent to sub-frame 1. The same applies to sub-frames 3 and 4 as well. That is, R4 to R7 are mapped to an RB shifted by one RB in the frequency domain every sub-frame.

Thus, terminal 200 (LTE+ terminal) can perform CQI measurement and PMI estimation using eight cell-specific RSs (R0 to R7) in any one RB of one sub-frame and can update CQI and PMI for all RBs 0 to 3 in four continuous sub-frames. Terminal 200 (LTE+ terminal) feeds back the obtained CQI and PMI to base station 100. Furthermore, base station 100 performs adaptive MCS control based on the fed back CQI and further MIMO-transmits transmission data using the fed back PMI. Terminal 200 (LTE+ terminal) may also feed back the CQI and PMI obtained in each sub-frame to the base station every sub-frame. Thus, terminal 200 (LTE+ terminal) can reduce the amount of feedback per sub-frame and can feed back newer CQI and PMI per RB—that is, accurate CQI and PMI. Furthermore, terminal 200 (LTE+ terminal) may obtain all CQIs and PMIs of RB0 to RB3 and then feed back CQIs and PMIs to the base station at a time.

Here, high-speed transmission (MIMO transmission) using eight antennas of base station 100 is assumed to be performed in a micro cell having a small cell radius. Thus, high-speed transmission using eight antennas of base station 100 supports only LTE+ terminals that move at low speed. Thus, as shown in FIG. 8, even when a long time interval of four sub-frames is required to perform CQI measurement and PMI estimation in all RBs, the fluctuation of channel quality over four sub-frames is slow, and therefore the deterioration in accuracy of CQI measurement and PMI estimation is small. That is, base station 100 can perform adaptive MCS control and MIMO transmission using CQI and PMI of sufficient accuracy from terminal 200 (LTE+ terminal), and can thereby improve the throughput.

Furthermore, when data of terminal 200 (LTE+ terminal) is allocated to RBs ("4 RSs" shown in FIG. 8) to which R4 to R7 are not mapped, base station 100 maps terminal-specific RSs for data demodulation (R4 to R7 multiplied by terminal-specific weights) to RBs to which data has been allocated and transmits the data. That is, using terminal-specific RSs, base station 100 can allocate data signals directed to LTE+ terminals not only to RBs ("8 RSs" shown in FIG. 8) to which R4 to R7 are mapped but also to any RB0 to 3. Thus, base station 100 has no more scheduler constraints when allocating LTE+ terminals, and can thereby improve frequency scheduling effects.

However, RBs whereby terminal-specific RSs are transmitted vary depending on RBs to which base station 100 allocates LTE+ terminals and base station 100 notifies only RBs allocated to each LTE+ terminal to the LTE+ terminal. Therefore, each LTE+ terminal knows only the terminal-specific RSs of the RB allocated to the terminal. That is, other LTE+ terminals cannot perform CQI measurement and PMI estimation using the terminal-specific RSs. However, according to the present mapping method, the cell-specific RSs are transmitted on any one RB every sub-frame, and therefore other LTE+ terminals can perform CQI measurement and PMI estimation without knowing the terminal-specific RSs.

Thus, the present mapping method maps cell-specific RSs used only for LTE+ terminals only in part of a plurality of RBs in one frame. This allows the base station to allocate data signals directed to LTE terminals to RBs other than RBs to which cell-specific RSs used only for LTE+ terminals are mapped. Thus, LTE terminals do not erroneously receive cell-specific RSs used only for LTE+ terminals as data signals, and it is thereby possible to prevent deterioration of error rate characteristics. Therefore, even when LTE terminals and LTE+ terminals coexist, the present mapping method can prevent deterioration in the throughput of LTE terminals. Furthermore, when data signals directed to LTE+ terminals are allocated to RBs to which cell-specific RSs used only for LTE+ terminals are not mapped, the base station maps terminal-specific RSs to RBs. This allows the base station to allocate data signals directed to LTE+ terminals to all RBs, and it is thereby possible to improve the frequency scheduling effect.

Furthermore, the present mapping method maps cell-specific RSs used only for LTE+ terminals to RBs of different frequency domains between neighboring sub-frames and maps RSs to an RB shifted by one RB every sub-frame. This ensures that LTE+ terminals receive cell-specific RSs over a plurality of continuous sub-frames even in RBs to which data signals of the LTE+ terminals are not allocated. In this way, the LTE+ terminals can perform CQI measurement and PMI estimation accurately in all frequency bands. The amount of shift of cell-specific RSs does not necessarily have to be one RB.

Figure 9:
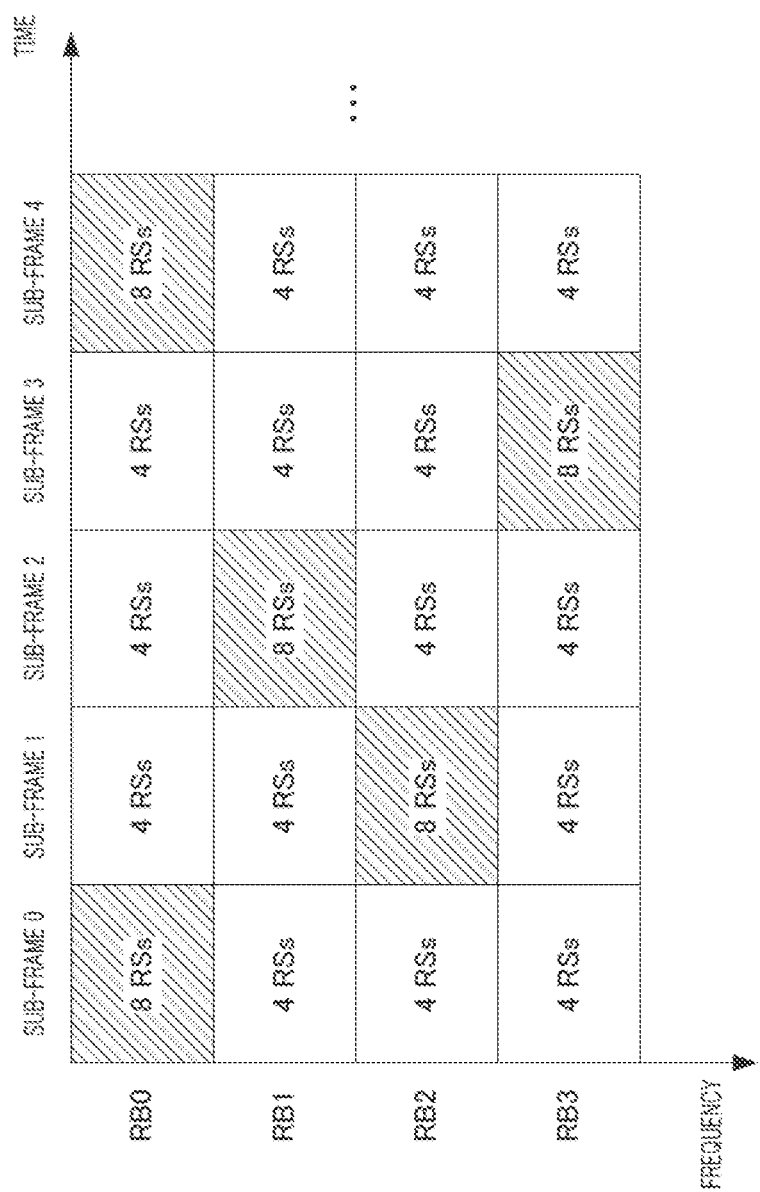
FIG. 9 shows an RS mapping pattern according to Embodiment 1 of the present invention (mapping method 1)
Figure 10:
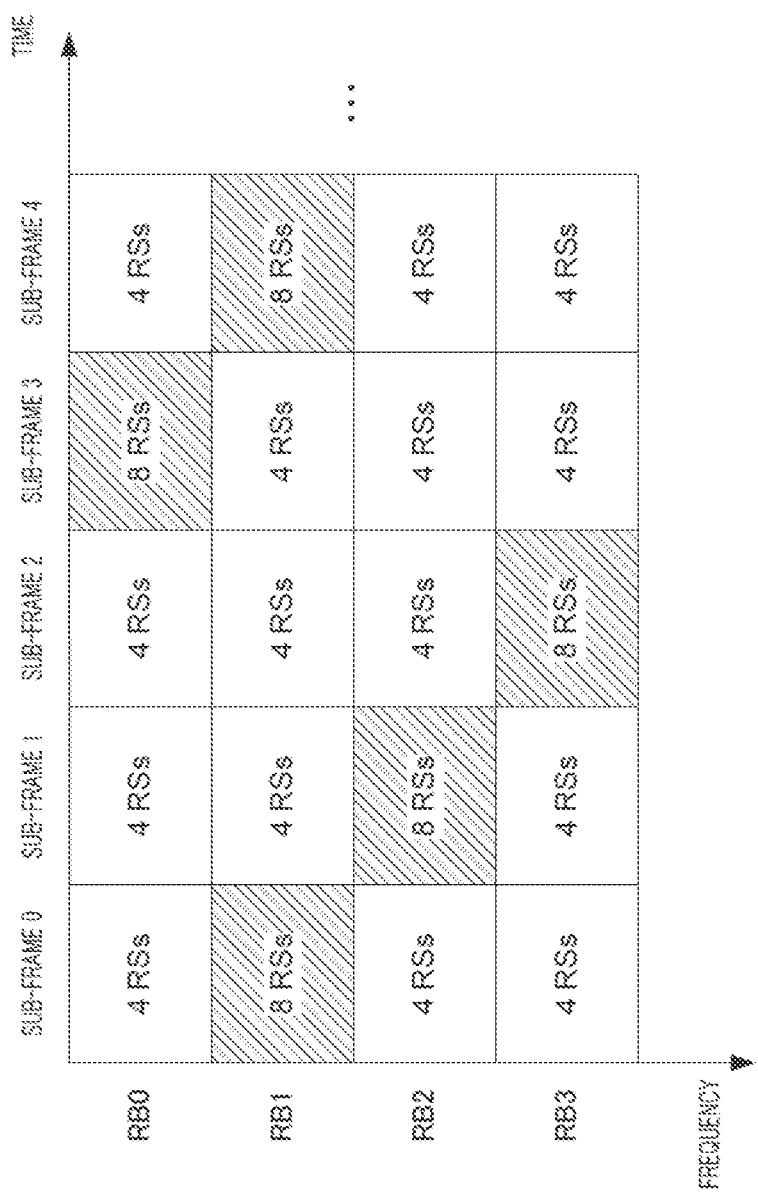
FIG. 10 shows an RS mapping pattern according to Embodiment 1 of the present invention (mapping method 1)

The present mapping method may also use an RS mapping pattern whose time domain and frequency domain differ from one cell to another. For example, of two neighboring base stations, one base station may use the mapping pattern shown in FIG. 8, while the other base station may use an mapping pattern shown in FIG. 9. In the mapping pattern shown in FIG. 8, R4 to R7 are mapped to RBs 0, 1, 2, 3 and 0 in order of sub-frames 0, 1, 2, 3 and 4, while in the mapping pattern shown in FIG. 9, R4 to R7 are mapped to RBs 0, 2, 1, 3 and 0 in order of sub-frames 0, 1, 2, 3 and 4. That is, in the mapping pattern shown in FIG. 9, R4 to R7 are mapped to some RBs shifted by a plurality of RBs (here, two RBs) in the frequency domain every sub-frame in one frame. Alternatively, while one of the two neighboring base stations uses the mapping pattern shown in FIG. 8, the other base station may also use an mapping pattern shown in FIG. 10. In the mapping pattern shown in FIG. 10, R4 to R7 are mapped to RBs 1, 2, 3, 0 and 1 in order of sub-frames 0, 1, 2, 3 and 4. That is, in the mapping pattern shown in FIG. 8, R4 to R7 are mapped to RBs shifted by one RB from RB0 in sub-frame 0, while in the mapping pattern shown in FIG. 10, R4 to R7 are mapped to RBs shifted by one RB from RB1 in sub-frame 0. This can reduce the probability that R4 to R7 may be mapped to the same time domain and the same frequency domain in a plurality of cells. Cell-specific RSs are generally transmitted to all terminals in a cell, and are therefore transmitted with greater transmission power than that of data symbols. That is, a terminal located on the cell boundary receives not only cell-specific RSs from the cell to which the terminal belongs but also cell-specific RSs from neighboring cells, and therefore interference between cell-specific RSs of different cells increases. However, as described above, using mapping patterns whose time domain and frequency domain differ from one cell to another makes it possible to reduce interference between cell-specific RSs of different cells and thereby improves the accuracy of CQI measurement and PMI estimation in each terminal.

Furthermore, the present invention may also be adapted such that one frame is comprised of four sub-frames and one frame constitutes one cycle of an mapping pattern in which R4 to R7 are mapped to all RBs. In this case, an LTE+ terminal that has moved from a neighboring cell due to handover or the like can receive cell-specific RSs (R4 to R7) without knowing frame numbers.

<Mapping Method 2 (FIG. 11)>

While mapping method 1 maps cell-specific RSs used only for LTE+ terminals to one RB in the same sub-frame, the present mapping method maps cell-specific RSs used only for LTE+ terminals to a plurality of RBs in the same sub-frame.

When the terminal moves slow, the fluctuation of channel quality between the base station and the terminal becomes slow. On the other hand, when the terminal moves faster, the fluctuation of channel quality between the base station and the terminal becomes more intense. That is, when the terminal moves faster, the fluctuation of channel quality per sub-frame becomes more intense. Thus, when the terminal moves faster, use of an RS acquired in a sub-frame preceding by a long time interval prevents the channel quality at the current point in time from being correctly reflected, causing the accuracy of CQI measurement and PMI estimation to deteriorate.

Thus, according to the present mapping method, cell-specific RSs (R4 to R7) used only for LTE+ terminals in the same sub-frame are mapped to a plurality of RBs.

Figure 11:
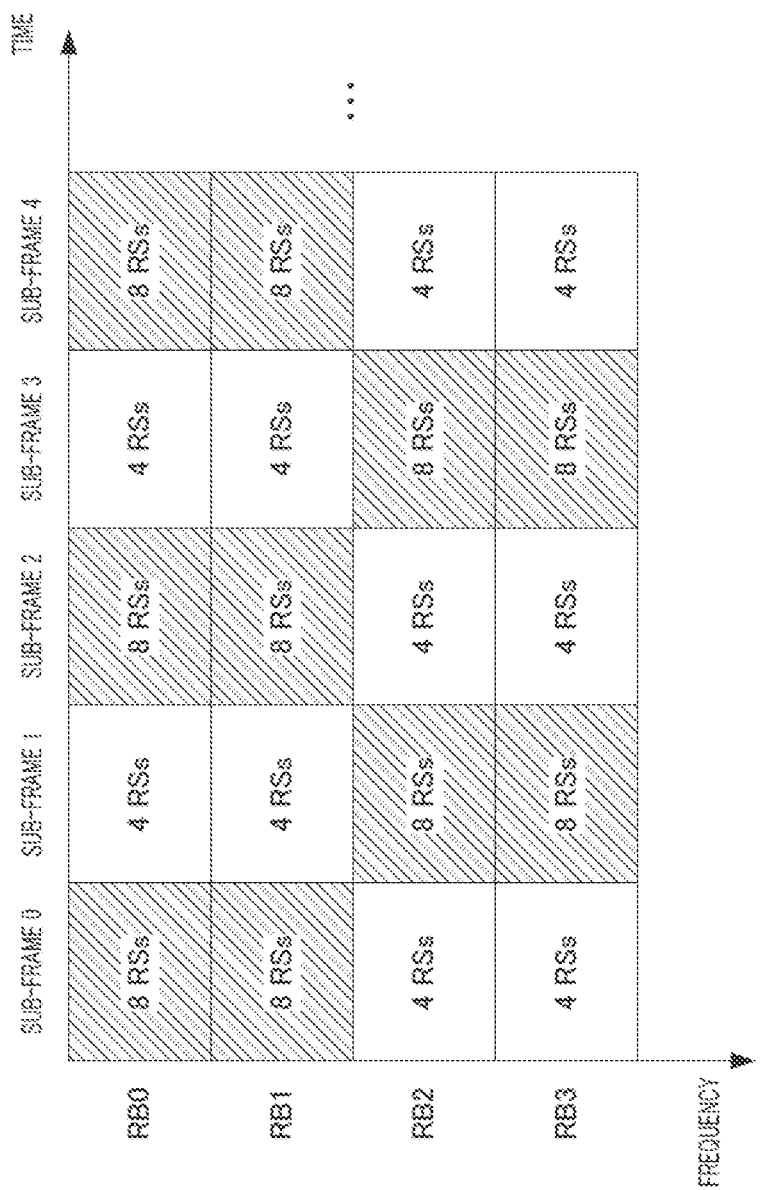
FIG. 11 shows an RS mapping pattern according to Embodiment 1 of the present invention (mapping method 2)

To be more specific, as shown in FIG. 11, R4 to R7 in sub-frame 0 are mapped to RB0 and RB1, R4 to R7 in sub-frame 1 are mapped to RB2 and RB3, R4 to R7 in sub-frame 2 are mapped to RB0 and RB1, R4 to R7 in sub-frame 3 are mapped to RB2 and RB3 and R4 to R7 in sub-frame 4 are mapped to RB0 and RB1.

That is, as shown in FIG. 11, setting section 105 (FIG. 4) of base station 100 sets two RBs, RB0 and RB1, in sub-frame 0 and two RBs, RB2 and RB3, in sub-frame 1 as RBs to which cell-specific RSs used only for LTE+ terminals (R4 to R7) are mapped. The same applies to sub-frames 2 to 4 as well.

Furthermore, as shown in FIG. 7, mapping section 106 maps R4 to R7 to corresponding REs in RB0 and corresponding REs in RB1 in sub-frame 0 respectively and maps R4 to R7 to corresponding REs in RB2 and corresponding REs in RB3 in sub-frame 1 respectively. The same applies to sub-frames 2 to 4 as well.

As shown in FIG. 11, R4 to R7 are mapped to ten RBs out of twenty RBs in one frame. That is, only R0 to R3 that can be received by LTE terminals are transmitted on ten RBs ("4 RSs" shown in FIG. 11) other than some RBs ("8 RSs" shown in FIG. 11) to which R4 to R7 are mapped. Thus, LTE terminals can prevent deterioration of error rate characteristics in the same way as with mapping method 1 (FIG. 8).

Furthermore, according to mapping method 1 (FIG. 8), terminal 200 (LTE+ terminal) can receive cell-specific RSs (R0 to R7) of all RBs in four sub-frames, while in FIG. 11, terminal 200 (LTE+ terminal) can receive cell-specific RSs (R0 to R7) of all RBs in two sub-frames. In other words, according to mapping method 1 (FIG. 8), terminal 200 (LTE+ terminal) can receive R4 to R7 every four sub-frames in the same RB, while in FIG. 11, terminal 200 (LTE+ terminal) can receive R4 to R7 every two sub-frames in the same RB. That is, terminal 200 (LTE+ terminal) can receive new R4 to R7 at shorter sub-frame intervals than mapping method 1. Thus, the present mapping method can update channel quality for all RBs at shorter sub-frame intervals than mapping method 1. In this way, even when terminal 200 (LTE+ terminal) moves fast, it is possible to use channel quality measured using cell-specific RSs in a sub-frame, the reception time of which is newer, and therefore terminal 200 can improve the accuracy of CQI measurement and PMI estimation.

Figure 12:
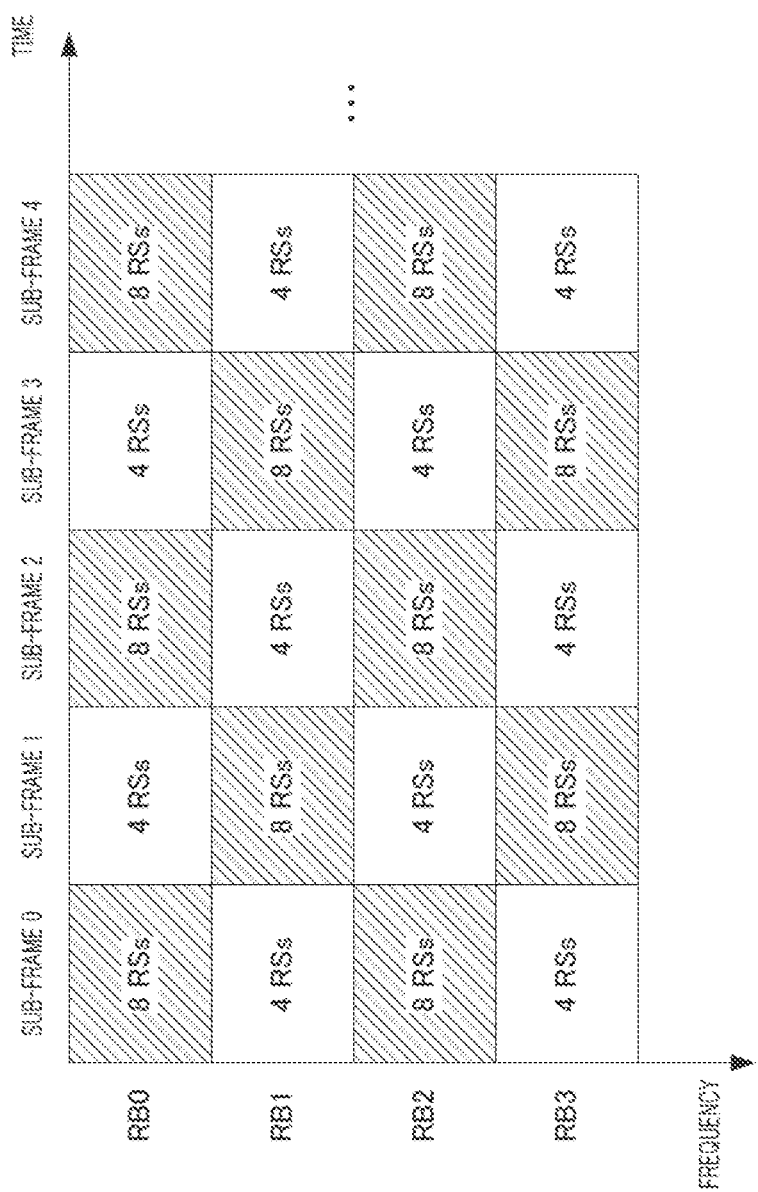
FIG. 12 shows an RS mapping pattern according to Embodiment 1 of the present invention (mapping method 2)

The present mapping method may also use an mapping pattern shown in FIG. 12 instead of the mapping pattern shown in FIG. 11. That is, cell-specific RSs used only for LTE+ terminals (R4 to R7) may be mapped to a plurality of discontinuous RBs in the frequency domain in the same sub-frame.

To be more specific, as shown in FIG. 12, in sub-frame 0, R4 to R7 are mapped to RB0 and to RB2 which is discontinuous to RB0 in the frequency domain, while in sub-frame 1, R4 to R7 are mapped to RB1 and to RB3 which is discontinuous to RB1 in the frequency domain. The same applies to sub-frames 2 to 4 as well.

By mapping cell-specific RSs used only for LTE+ terminals to a plurality of discontinuous RBs in the frequency domain in the same sub-frame, RBs ("4 RSs" shown in FIG. 12) to which base station 100 can allocate data signals directed to LTE terminals also become discontinuous in the frequency domain. Thus, even when frequency selectivity is slow, base station 100 can allocate RBs which are distributed in the frequency domain to LTE terminals. This prevents base station 100 from continuously allocating LTE terminals to RBs of low receiving quality, and can thereby improve the frequency scheduling effect.

In the present mapping method, the number of RBs to which LTE terminals can be allocated decreases compared to mapping method 1 (FIG. 8). However, since RBs to which LTE terminals can be allocated vary from one sub-frame to another, base station 100 can allocate LTE terminals to RBs with high channel quality in one of two continuous sub-frames. That is, the deterioration in the frequency scheduling effect due to the reduction in the number of RBs to which LTE terminals can be allocated is small.

Thus, according to the present mapping method, cell-specific RSs used only for LTE+ terminals are mapped to part of a plurality of RBs in the same sub-frame. This provides similar effects to those of mapping method 1 to be obtained. Furthermore, according to the present mapping method, even when LTE+ terminals that move fast are present, the LTE+ terminals can perform CQI measurement and PMI estimation using RSs received in newer sub-frames—that is, RSs in which channel quality at the current point in time is reflected.

According to the present mapping method, base station 100 may switch between the mapping pattern shown in FIG. 11 and the mapping pattern shown in FIG. 12 in accordance with the situation (frequency selectivity) of the propagation path in a cell. That is, setting section 105 of base station 100 may change the frequency interval of a plurality of RBs in the same sub-frame to which R4 to R7 are mapped in accordance with the condition of the propagation path in the cell. This allows base station 100 to perform scheduling that matches the situation of the propagation path, and can thereby further improve the frequency scheduling effect.

<Mapping Method 3 (FIG. 13)>

According to the present mapping method, cell-specific RSs used only for LTE+ terminals are mapped to part of RBs at predetermined sub-frame intervals.

As described above, when a terminal moves slow, the fluctuation of channel quality between the base station and the terminal becomes slower. Thus, when the terminal moves slow, the accuracy of CQI measurement and PMI estimation does not deteriorate even when the channel quality obtained using RSs acquired in a sub-frame preceding by a long time interval is used as channel quality at the current point in time. Thus, when the terminal moves slow, cell-specific RSs used only for LTE+ terminals need not be mapped to RBs every sub-frame as in the case of mapping method 1 (FIG. 8).

Thus, the present mapping method maps cell-specific RSs used only for LTE+ terminals (R4 to R7) to part of RBs at predetermined sub-frame intervals.

In the following descriptions, it is assumed that the predetermined sub-frame interval is two sub-frames. Furthermore, cell-specific RSs used only for LTE+ terminals (R4 to R7) are mapped to a plurality of discontinuous RBs in the frequency domain in the same sub-frame in the same way as with mapping method 2 (FIG. 12).

Figure 13:
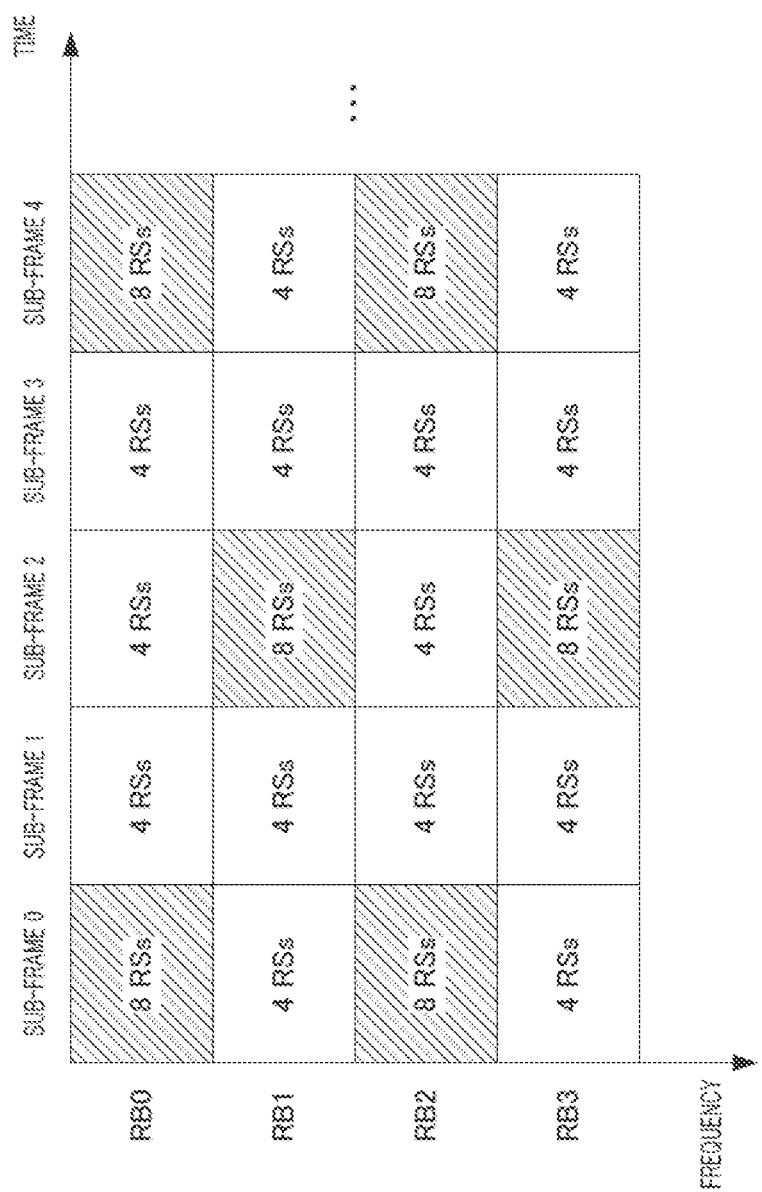
FIG. 13 shows an RS mapping pattern according to Embodiment 1 of the present invention (mapping method 3)

To be more specific, as shown in FIG. 13, R4 to R7 are mapped to RB0 and RB2 in sub-frame 0, R4 to R7 are mapped to RB1 and RB3 in sub-frame 2 at an interval of two sub-frames from sub-frame 0 and R4 to R7 are mapped to RB0 and RB2 in sub-frame 4 at an interval of two sub-frames from sub-frame 2.

That is, as shown in FIG. 13, setting section 105 (FIG. 4) of base station 100 sets two RBs, RB0 and RB2, in sub-frame 0, sets two RBs, RB1 and RB3, in sub-frame 2 and sets two RBs, RB0 and RB2, in sub-frame 4 as RBs to which cell-specific RSs used only for LTE+ terminals (R4 to R7) are mapped. On the other hand, setting section 105 does not set any RB, to which R4 to R7 are mapped, in sub-frame 1 and sub-frame 3.

Furthermore, as shown in FIG. 7, mapping section 106 maps R4 to R7 to corresponding REs in RB0 and to corresponding REs in RB2 in sub-frame 0 respectively, maps R4 to R7 to corresponding REs in RB1 and to corresponding REs in RB3 in sub-frame 2 respectively and maps R4 to R7 to corresponding REs in RB0 and to corresponding REs in RB2 in sub-frame 4 respectively.

As shown in FIG. 13, R4 to R7 are mapped to only six RBs out of twenty RBs in one frame. That is, only R0 to R3 that can be received by LTE terminals are transmitted on fourteen RBs ("4 RSs" shown in FIG. 13) other than some RBs ("8 RSs" shown in FIG. 13) to which R4 to R7 are mapped. Thus, LTE terminals can prevent deterioration of error rate characteristics in the same way as with mapping method 1 (FIG. 8).

Furthermore, in FIG. 13, terminal 200 (LTE+ terminal) can receive cell-specific RSs (R0 to R7) of all RBs in four sub-frames. Thus, terminal 200 (LTE+ terminal) can update CQI and PMI for each RB every four sub-frames in the same way as with mapping method 1 (FIG. 8).

In this way, according to the present mapping method, cell-specific RSs used only for LTE+ terminals are mapped to part of RBs at predetermined sub-frame intervals. It is thereby possible to reduce the number of cell-specific RSs used only for LTE+ terminals in one frame while maintaining the accuracy of CQI measurement and PMI estimation in LTE+ terminals and increase the number of RBs to which data signals directed to LTE terminals are allocated. Thus, according to the present mapping method, even when LTE terminals and LTE+ terminals coexist, it is possible to secure as many RBs as possible to be allocated to LTE terminals and thereby prevent deterioration in the throughput of LTE terminals in the same way as with mapping method 1.

The present mapping method assumes the predetermined sub-frame interval to be two sub-frames, but the predetermined sub-frame interval is not limited to two sub-frames. For example, base station 100 may set the predetermined sub-frame interval according to the speed at which LTE+ terminals move. To be more specific, the slower the LTE+ terminals move, the slower is the fluctuation of channel quality, and therefore base station 100 may increase the predetermined sub-frame interval. Furthermore, the predetermined sub-frame interval may be notified through RRC signaling per terminal or broadcast per cell.

Mapping methods 1 to 3 of the present embodiment have been described so far.

Thus, even when LTE terminals and LTE+ terminals coexist, the present embodiment can prevent deterioration in the throughput of LTE terminals. Furthermore, according to the present embodiment, the base station can perform frequency scheduling for more frequency bands because there are no more scheduling constraints on RBs to which LTE+ terminals are allocated and the number of RBs to which LTE terminals are allocated increases.

The present embodiment has described a case where the number of sub-frames, of which one frame is comprised, is five and a plurality of subcarriers in one sub-frame are divided into four RBs. However, with the present invention, the number of sub-frames, of which one frame is comprised, is not limited to five and the number of RBs into which the plurality of subcarriers are divided in one sub-frame is not limited to four.

Embodiment 2

The present embodiment will describe a case where mapping methods 1 to 3 of Embodiment 1 are switched in accordance with a cell environment.

As described above, mapping method 1 can reduce the number of RBs to which cell-specific RSs used only for LTE+ terminals (R4 to R7) are mapped compared to mapping method 2. On the other hand, mapping method 2 allows the base station to transmit cell-specific RSs (R4 to R7) in all RBs at shorter sub-frame intervals than that of mapping method 1. That is, mapping method 1 can secure more RBs to which LTE terminals are allocated in one frame than mapping method 2, whereas mapping method 2 can shorten the sub-frame interval at which LTE+ terminals can update channel quality for all frequency domains compared to mapping method 1.

Similarly, mapping method 3 can secure more RBs to which LTE terminals are allocated in one frame than mapping method 2, whereas mapping method 2 can shorten the sub-frame interval at which LTE+ terminals can update channel quality for all frequency domains compared to mapping method 3.

That is, mapping method 1 (mapping method 3) and mapping method 2 have a trade-off relationship between the number of RBs in which LTE terminals can be allocated in one frame and a sub-frame interval at which LTE+ terminals can update channel quality for all RBs.

Thus, setting section 105 (FIG. 4) according to the present embodiment switches between mapping method 1 (mapping method 3) and mapping method 2 of Embodiment 1 in accordance with a cell environment and sets RBs to which cell-specific RSs (R4 to R7) are mapped.

Hereinafter, switching methods 1 and 2 by setting section 105 of the present embodiment will be described.

<Switching Method 1>

The present switching method switches the mapping method according to the number of LTE terminals in a cell.

As described above, base station 100 (FIG. 4) maps R4 to R7 which are terminal-specific RSs, and can thereby allocate LTE+ terminals to RBs other than RBs to which cell-specific RSs (R4 to R7) are mapped. By contrast, base station 100 can only allocate LTE terminals to RBs other than RBs to which cell-specific RSs (R4 to R7) are mapped. Therefore, as the number of LTE terminals increases, base station 100 has to secure more RBs to which LTE terminals can be allocated—that is, RBs other than RBs to which cell-specific RSs used only for LTE+ terminals are mapped. In other words, as the number of LTE terminals increases, base station 100 has to reduce the number of RBs to which cell-specific RSs used only for LTE+ terminals are mapped.

On the other hand, as the number of LTE terminals decreases, base station 100 can secure more RBs to which cell-specific RSs used only for LTE+ terminals are mapped. This allows terminal 200 (FIG. 5) to receive cell-specific RSs used only for LTE+ terminals at more RBs and thereby improves the frequency scheduling effect of LTE+ terminals.

Thus, when there are more LTE terminals, setting section 105 sets RBs to which R4 to R7 are mapped using mapping method 1 (mapping method 3) and sets, when there are fewer LTE terminals, RBs to which R4 to R7 are mapped using mapping method 2. To be more specific, setting section 105 compares the number of LTE terminals and a preset threshold, and switches the mapping method. That is, setting section 105 switches to mapping method 1 (mapping method 3) when the number of LTE terminals is equal to or greater than the threshold and switches to mapping method 2 when the number of LTE terminals is less than the threshold. That is, setting section 105 changes the number of cell-specific RSs used only for LTE+ terminals according to the number of LTE terminals in a cell.

Thus, when the number of LTE terminals is large, base station 100 uses mapping method 1 (mapping method 3) and can thereby secure as many RBs as possible to which LTE terminals can be allocated while mapping cell-specific RSs used only for LTE+ terminals to part of RBs. On the other hand, when the number of LTE terminals is small, base station 100 uses mapping method 2 and can thereby secure as many RBs as possible to which cell-specific RSs used only for LTE+ terminals are mapped while securing RBs to which LTE terminals can be allocated.

By this means, according to the present switching method, when the number of LTE terminals in a cell is large, the base station switches to an mapping method that allows RBs to which LTE terminals can be allocated to be obtained preferentially. On the other hand, when the number of LTE terminals in the cell is small, the base station shortens the sub-frame interval at which LTE+ terminals can receive cell-specific RSs in all frequency bands and thereby switches to an mapping method whereby the frequency scheduling effect can be obtained preferentially. In this way, regardless of whether the number of LTE terminals in the cell is large or small, it is possible to obtain the frequency scheduling effect in LTE+ terminals while securing RBs to which LTE terminals are allocated.

<Switching Method 2>

The present switching method switches an mapping method according to the moving speed of LTE+ terminals in a cell.

As described above, the higher the moving speed of an LTE+ terminal, the more intense is the fluctuation of channel quality, and therefore terminal 200 has to update channel quality for each RB at shorter time intervals—that is, at shorter sub-frame intervals—to perform CQI measurement and PMI estimation without deteriorating the accuracy.

On the other hand, the lower the moving speed of an LTE+ terminal, the slower is the fluctuation of channel quality, and therefore terminal 200 can perform CQI measurement and PMI estimation without deteriorating the accuracy even when channel quality for each RB is updated at a longer time interval—that is, at longer sub-frame intervals.

Thus, when the moving speed of the LTE+ terminal is low, setting section 105 sets RBs to which R4 to R7 are mapped using mapping method 1 (mapping method 3) and sets RBs to which R4 to R7 are mapped using mapping method 2 when the moving speed of the LTE+ terminal is high. To be more specific, setting section 105 compares the moving speed of the LTE+ terminal with a preset threshold and switches the mapping method. That is, setting section 105 switches to mapping method 1 (mapping method 3) when there are only LTE+ terminals whose moving speed is equal to or below the threshold, and switches to mapping method 2 when there are only LTE+ terminals whose moving speed is greater than the threshold. That is, setting section 105 changes the sub-frame interval at which cell-specific RSs used only for LTE+ terminals are mapped according to the moving speed of LTE+ terminals.

In this way, when the moving speed of an LTE+ terminal is low, base station 100 uses mapping method 1 (mapping method 3), and can thereby reduce the number of RBs to which cell-specific RSs used only for LTE+ terminals are mapped to a necessary minimum and secure as many RBs as possible to which LTE terminals can be allocated. On the other hand, when the moving speed of an LTE+ terminal is low, base station 100 uses mapping method 2, and can thereby secure the number of RBs to which LTE terminals can be allocated and secure as many RBs as possible to which cell-specific RSs used only for LTE+ terminals are mapped.

By this means, according to the present switching method, when the moving speed of an LTE+ terminal in a cell is low, the base station switches to an mapping method whereby RBs to which LTE terminals can be allocated can be obtained preferentially. On the other hand, when the moving speed of the LTE+ terminal in the cell is high, the base station shortens the sub-frame interval at which LTE+ terminals can receive cell-specific RSs in all frequency bands and thereby switches to an mapping method whereby a frequency scheduling effect can be obtained preferentially. Thus, whether the moving speed of the LTE+ terminal in the cell is high or low, it is possible to obtain the frequency diversity effect in the LTE+ terminal while securing the number of RBs to which LTE terminals are allocated in the same way as with switching method 1.

Switching methods 1 and 2 by setting section 105 of the present embodiment have been described so far.

Thus, the present embodiment switches between mapping methods for cell-specific RSs used only for LTE+ terminals in accordance with a cell environment. Thus, it is possible to obtain a maximum frequency scheduling effect in LTE+ terminals while securing as many RBs as possible to which LTE terminals can be allocated in accordance with the cell environment.

In the present embodiment, when switching between the mapping pattern of mapping method 1 (mapping method 3) and the mapping pattern of mapping method 2, base station 100 (FIG. 4) may broadcast information indicating that the mapping pattern has been switched to all terminals 200 (LTE+ terminals) using a BCH signal. Here, mapping patterns 1 to 3 are shared between base station 100 and terminal 200. In this way, base station 100 can switch between mapping patterns in accordance with a cell environment without the need of notifying the mapping pattern to terminal 200 every time the mapping pattern is switched. Furthermore, base station 100 may individually notify information indicating the fact that the mapping pattern has been switched to LTE+ terminals using RRC (Radio Resource Control) signaling.

Embodiment 3

3GPP-LTE defines, for example, the following three methods as methods for allocating LTE terminals to RBs. A first allocation method (hereinafter referred to as "type 0 allocation") is a method whereby a plurality of RBs in a system band are grouped into a plurality of RB groups and the base station allocates LTE terminals in units of RB groups. Here, the number of RBs, of which an RB group is comprised, differs depending on the system bandwidth. Type 0 allocation has a high degree of freedom of RB allocation, is suitable for transmission of large-volume data through frequency scheduling and allows high throughput to be obtained.

A second allocation method (hereinafter referred to as "type 1 allocation") is a method whereby part of RB groups in the system band are extracted and the base station allocates terminals in units of RBs within extracted part of RB groups. According to type 1 allocation, although combinations of RBs simultaneously allocated to terminals are limited, terminals are allocated in units of RBs and the granularity of RB allocation becomes finer, and is therefore suitable for RB allocation for terminals transmitting only a small amount of data.

A third allocation method (hereinafter referred to as "type 2 allocation") is a method whereby the base station allocates terminals to continuous RBs in the frequency domain. According to type 2 allocation, the base station has only to notify start points and end points of RBs, to which terminals are allocated, to the terminals, and the amount of information for notifying the RB allocation result is therefore smaller. Furthermore, according to type 2 allocation, combinations of RBs simultaneously allocated to terminals are limited as in the case of type 1 allocation, but since terminals are allocated in units of RBs, the granularity of RB allocation becomes finer, and is therefore suitable for RB allocation of terminals transmitting only a small amount of data.

Here, the base station cannot allocate LTE terminals to RBs to which cell-specific RSs used only for LTE+ terminals (R4 to R7) are mapped. For this reason, according to type 0 allocation that performs RB allocation in units of RB groups, when RBs to which cell-specific RSs used only for LTE+ terminals are mapped are included in some of a plurality of RBs of which an RB group is comprised, the base station cannot allocate LTE terminals to the RB group. That is, with type 0 allocation, RB groups that can be allocated to LTE terminals are limited and scheduling constraints on RBs to which LTE terminals are allocated may increase.

Figure 14:
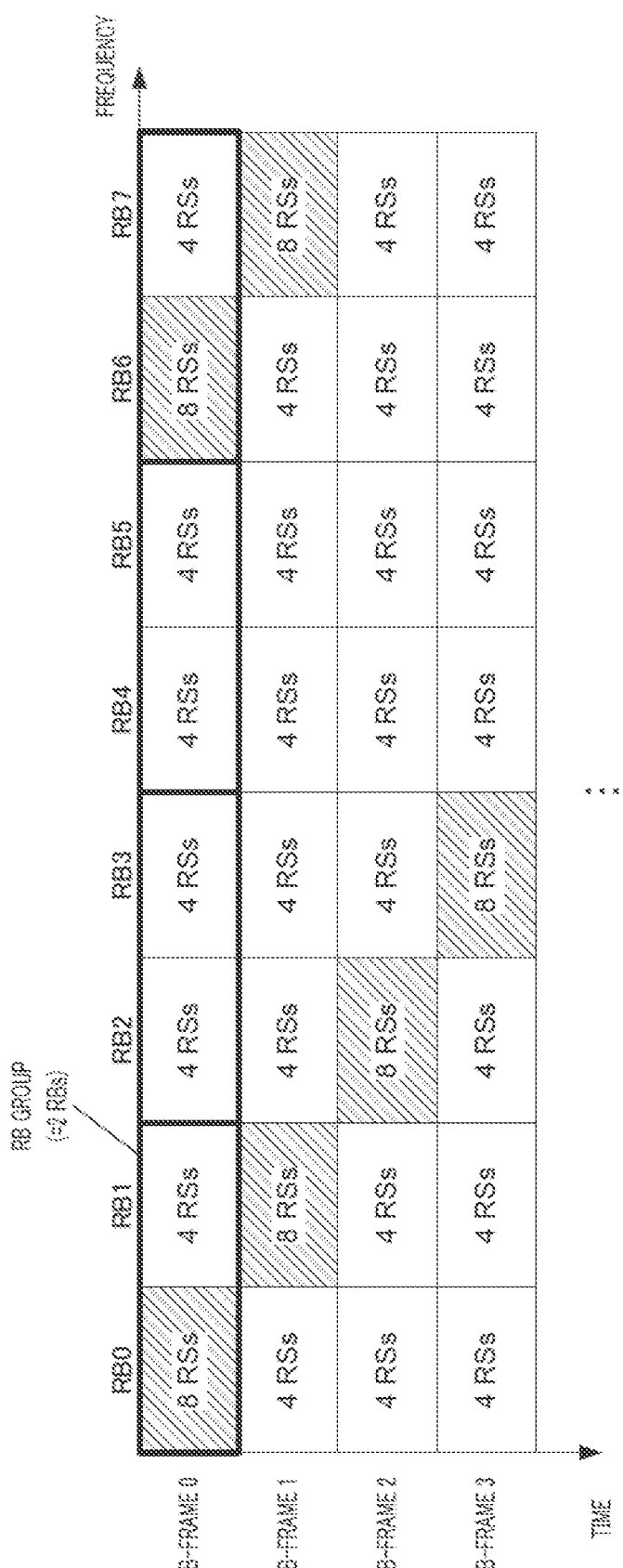
FIG. 14 shows problems associated with Embodiment 3 of the present invention.

For example, FIG. 14 shows an example of RS mapping where cell-specific RSs used only for LTE+ terminals are mapped to RBs shifted by one RB in the frequency domain every sub-frame. FIG. 14 describes an example where a plurality of subcarriers are uniformly divided into eight RBs, RB0 to RB7, in one sub-frame. Furthermore, one RB group is comprised of two RBs (that is, RB group size: two RBs). For example, as shown in FIG. 14, RB0 and RB1 constitute one RB group, RB2 and RB3 constitute one RB group, RB4 and RB5 constitute one RB group and RB6 and RB7 constitute one RB group. Furthermore, as in the case of Embodiment 1, as shown in FIG. 14, an RB to which four RSs, R0 to R3, are mapped (FIG. 6) is represented as "4 RSs" and an RB to which eight RSs, R0 to R7, are mapped (FIG. 7) is represented as "8 RSs."

Here, in sub-frame 0 shown in FIG. 14, cell-specific RSs used only for LTE+ terminals (R4 to R7) are mapped to two RBs, RB0 and RB6. For this reason, the base station cannot allocate LTE terminals to an RB group including RB0 (RB group is comprised of RB0 and RB1 shown in FIG. 14) and an RB group including RB6 (RB group is comprised of RB6 and RB7 shown in FIG. 14). Therefore, of eight RBs, RB0 to RB7, in sub-frame 0 shown in FIG. 14, cell-specific RSs used only for LTE+ terminals are mapped to two RBs (RB0 and RB6), whereas LTE terminals cannot be allocated to four RBs (RB0, RB1, RB6 and RB7).

Thus, according to type 0 allocation, there may be RBs to which LTE terminals cannot be allocated though these are RBs to which cell-specific RSs used for both LTE terminals and LTE+ terminals are mapped. Since type 0 allocation is an RB allocation method fit to transmit a large volume of data through frequency scheduling, scheduling constraints on RBs to which LTE terminals are allocated have a great influence on deterioration in the throughput of LTE terminals. In particular, when the RB group size is large, the deterioration in the throughput of LTE terminals is greater.

Thus, the present embodiment maps cell-specific RSs used only for LTE+ terminals to a plurality of RBs, of which part of RB groups is comprised, in the same sub-frame in one frame.

Hereinafter, a cell-specific RS mapping method of the present embodiment will be described.

Figure 15:
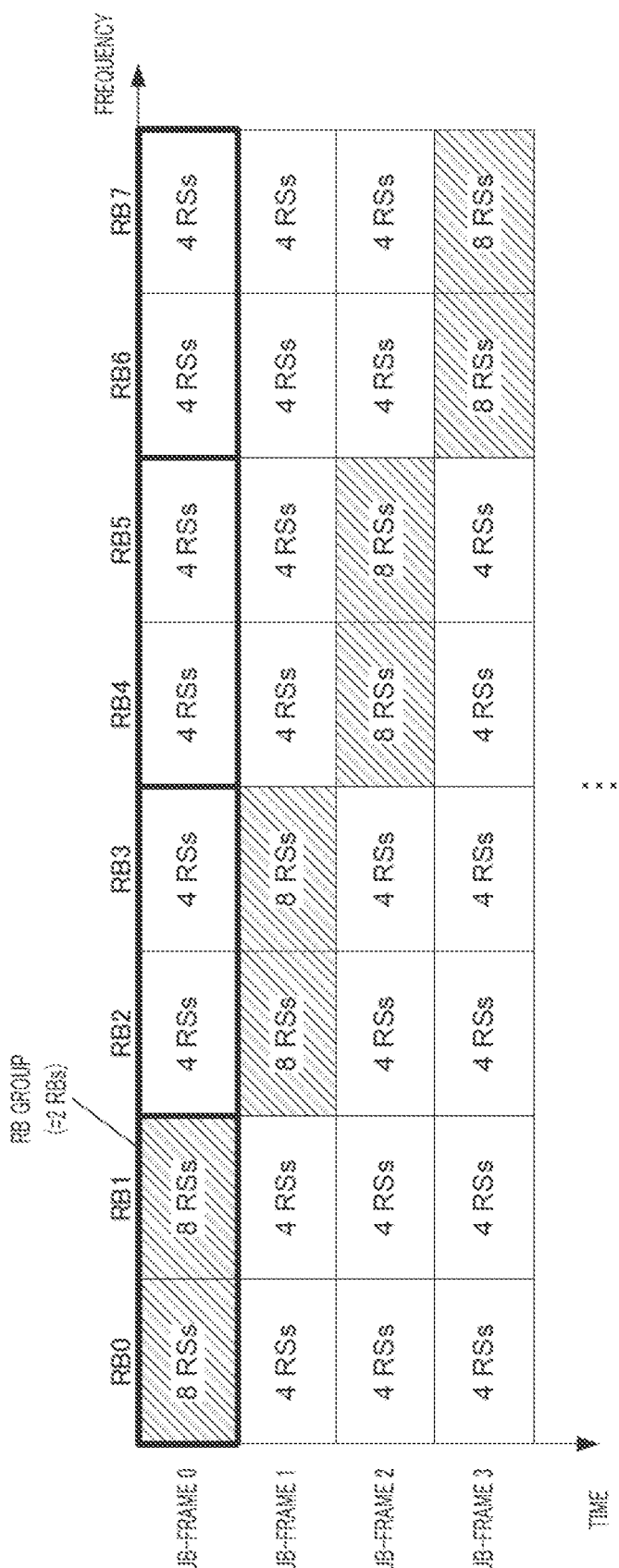
FIG. 15 shows an RS mapping pattern according to Embodiment 3 of the present invention.

In the following descriptions, as shown in FIG. 15, one RB group is comprised of two RBs in the same way as FIG. 14 (RB group size: 2).

The present embodiment maps cell-specific RSs used only for LTE+ terminals (R4 to R7) to a plurality of RBs, of which part of RB groups is comprised, in the same sub-frame in one frame. To be more specific, as shown in FIG. 15, R4 to R7 are mapped to RB0 and RB1 constituting one RB group in sub-frame 0, R4 to R7 are mapped to RB2 and RB3 constituting one RB group in sub-frame 1, R4 to R7 are mapped to RB4 and RB5 constituting one RB group in sub-frame 2 and R4 to R7 are mapped to RB6 and RB7 constituting one RB group in sub-frame 3.

That is, as shown in FIG. 15, setting section 105 (FIG. 4) of base station 100 sets the RB group comprised of RB0 and RB1 in sub-frame 0 and sets the RB group comprised of RB2 and RB3 in sub-frame 1 as RB groups to which cell-specific RSs used only for LTE+ terminals (R4 to R7) are mapped. The same applies to sub-frame 2 and sub-frame 3 as well. That is, setting section 105 sets RBs to which cell-specific RSs used only for LTE+ terminals are mapped in units of RB groups.

Mapping section 106 (FIG. 4) of base station 100 maps R4 to R7 to a plurality of RBs constituting the RB group set by setting section 105. That is, as shown in FIG. 7, mapping section 106 maps R4 to R7 to corresponding REs in RB0 (and RB1) of sub-frame 0 respectively and maps R4 to R7 to corresponding REs in RB2 (and RB3) of sub-frame 1 respectively. The same applies to sub-frame 2 and sub-frame 3 as well.

As shown in FIG. 15, in each sub-frame, there is one RB group (that is, RB group including RBs to which cell-specific RSs used only for LTE+ terminals are mapped) to which LTE terminals cannot be allocated through type 0 allocation. That is, in each sub-frame, the number of RBs to which cell-specific RSs used only for LTE+ terminals are mapped is two, while the number of RBs to which LTE terminals cannot be allocated through type 0 allocation is also two.

Thus, cell-specific RSs used only for LTE+ terminals are mapped in units of RB groups, and therefore the number of RBs to which cell-specific RSs used only for LTE+ terminals are mapped is equal to the number of RBs to which LTE terminals cannot be allocated through type 0 allocation. That is, base station 100 can minimize the number of RBs to which LTE terminals cannot be allocated. It is thereby possible to minimize scheduling constraints on RBs to which LTE terminals are allocated and prevent deterioration in the throughput of LTE terminals.

By this means, even when terminals are allocated in units of RB groups, the present embodiment can prevent deterioration in the throughput of LTE terminals in the same way as Embodiment 1. Type 0 allocation that performs RB allocation in units of RB groups in particular is an RB allocation method that can improve the throughput of LTE terminals that perform high-speed transmission most. Thus, the present embodiment reduces scheduling constraints on RBs to which LTE terminals are allocated, and can thereby prevent any reduction in the number of RBs to which LTE terminals are allocated in a cell in which LTE terminals performing high-speed transmission are accommodated.

The present embodiment has described a case where the base station allocates terminals in units of RB groups. However, the base station of the present invention can provide similar effects to those of the present embodiment even when allocating terminals in units of integral multiples of the RB group.

Furthermore, the present embodiment has described a case where the number of sub-frames, of which one frame is comprised, is four and a plurality of subcarriers are divided into eight RBs in one sub-frame. However, according to the present invention, the number of sub-frames, of which one frame is comprised, is not limited to four and the number of RBs into which a plurality of subcarriers are divided in one sub-frame is not limited to eight.

Embodiment 4

Another RB allocation method other than the RB allocation (type 0 allocation, type 1 allocation and type 2 allocation) described in Embodiment 3 is distributed RB allocation (frequency hopping). According to distributed RB allocation, the base station allocates one terminal distributedly into a plurality of different RBs. A case will be described below where one terminal is allocated distributedly into two different RBs. That is, for example, each RB in one sub-frame is temporally divided into a first half part and a second half part in the time domain and the base station allocates one terminal distributedly into the first half part of one of the two different RBs and the second half part of the other RB. Furthermore, in distributed RB allocation, a frequency interval (RB interval, hopping interval or gap) between two different RBs is predetermined based on the system bandwidth. Distributed RB allocation that can obtain a frequency diversity effect compared to frequency scheduling whereby RBs with good quality are allocated every sub-frame is suitable for, for example, semi-persistent scheduling (SPS) intended for speech packet transmission which continues to use RBs once allocated.

Here, according to distributed RB allocation, when the base station allocates one LTE terminal, both two RBs to which the LTE terminal is allocated need to be RBs that can be allocated to the LTE terminal—that is, RBs to which cell-specific RSs used for both LTE terminals and LTE+ terminals are mapped. That is, according to distributed RB allocation, when RB to which cell-specific RSs used only for LTE+ terminals are mapped are included in the two RBs located by an RB interval predetermined through distributed RB allocation, the base station cannot allocate LTE terminals to the two RBs. That is, with distributed RB allocation, there may be cases where RBs that can be allocated to LTE terminals are limited, resulting in an increase of scheduling constraints on RBs to which LTE terminals are allocated.

Figure 16:
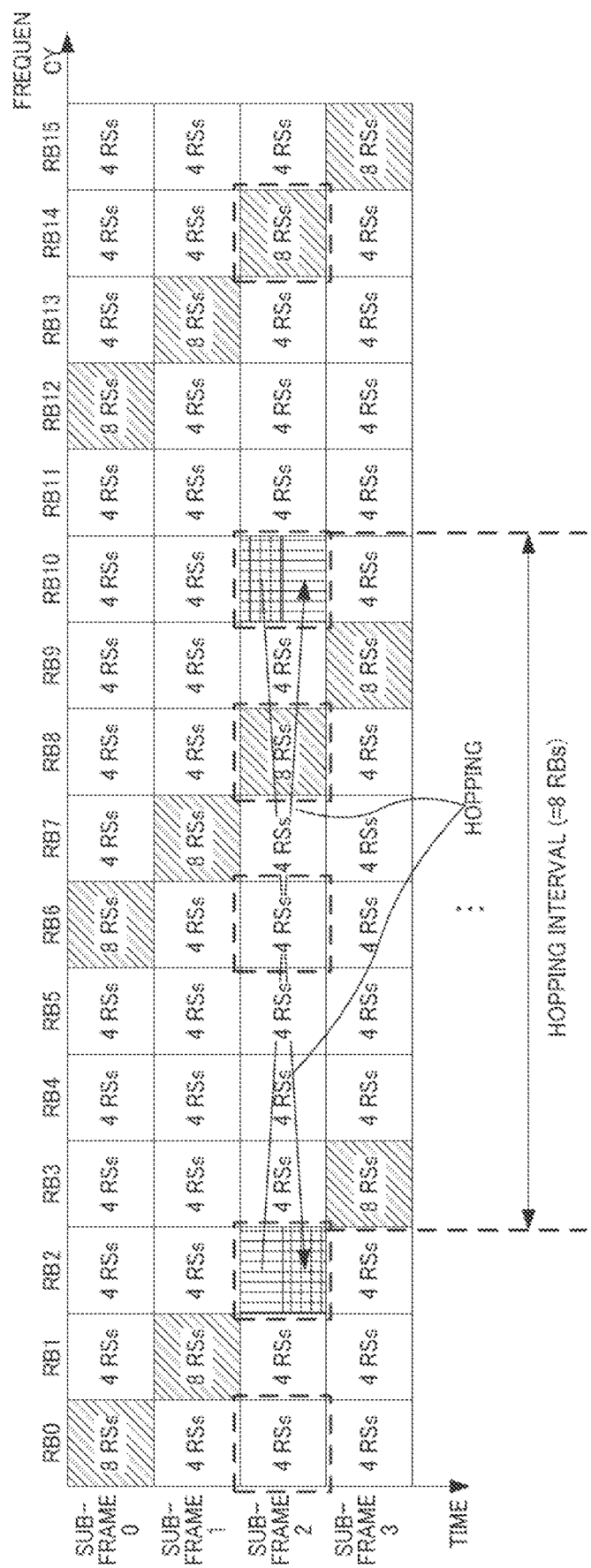
FIG. 16 shows problems associated with Embodiment 4 of the present invention.

FIG. 16 shows an example of RS mapping where cell-specific RSs used only for LTE+ terminals are mapped to RBs shifted by one RB in the frequency domain every sub-frame. In FIG. 16, it is assumed that the system bandwidth is sixteen RBs (RB0 to RB15) and the RB interval (hopping interval) between two RBs in distributed RB allocation is eight RBs. Furthermore, as in the case of Embodiment 1, as shown in FIG. 16, RBs (FIG. 6) to which four RSs, R0 to R3, are mapped are represented by "4 RSs" and RBs (FIG. 7) to which eight RSs, R0 to R7, are mapped are represented by "8 RSs." Furthermore, in sub-frame 2 shown in FIG. 16, cell-specific RSs used only for LTE+ terminals (R4 to R7) are mapped to three RBs, RB2, RB8 and RB14.

Here, a case is assumed where distributed RB allocation on a terminal is performed in sub-frame 2 shown in FIG. 16 using RB10. In this case, the first half part or the second half part of RB10 and the second half part or the first half part of RB2 located by hopping interval eight RBs away from RB10 are allocated to the terminal. However, since RB2 is an RB to which cell-specific RSs used only for LTE+ terminals are mapped, the base station cannot allocate LTE terminals to RB2 and RB10. Similarly, in addition to RB8 and RB14 to which cell-specific RSs used only for LTE+ terminals are mapped, the base station cannot allocate LTE terminals to RB0 located by eight RBs away from RB8 and RB6 by eight RBs away from RB14 either. Thus, of the sixteen RBs, RB0 to RB15, in sub-frame 2 shown in FIG. 16, cell-specific RSs used only for LTE+ terminals are mapped to three RBs (RB2, RB8 and RB14), whereas LTE terminals cannot be allocated to six RBs (RBs enclosed by broken lines shown in FIG. 16).

Thus, in distributed RB allocation, there may be RBs to which LTE terminals cannot be allocated although these are RBs to which cell-specific RSs used for both LTE terminals and LTE+ terminals are mapped. That is, according to distributed RB allocation, scheduling constraints on RBs to which LTE terminals are allocated may increase, resulting in a decrease of the throughput of LTE terminals or the number of speech terminals accommodated.

Thus, the present embodiment maps cell-specific RSs used only for LTE+ terminals to a plurality of RBs located by an RB interval (hopping interval) away from each other in distributed RB allocation.

Hereinafter, the cell-specific RS mapping method of the present embodiment will be described.

Figure 17:
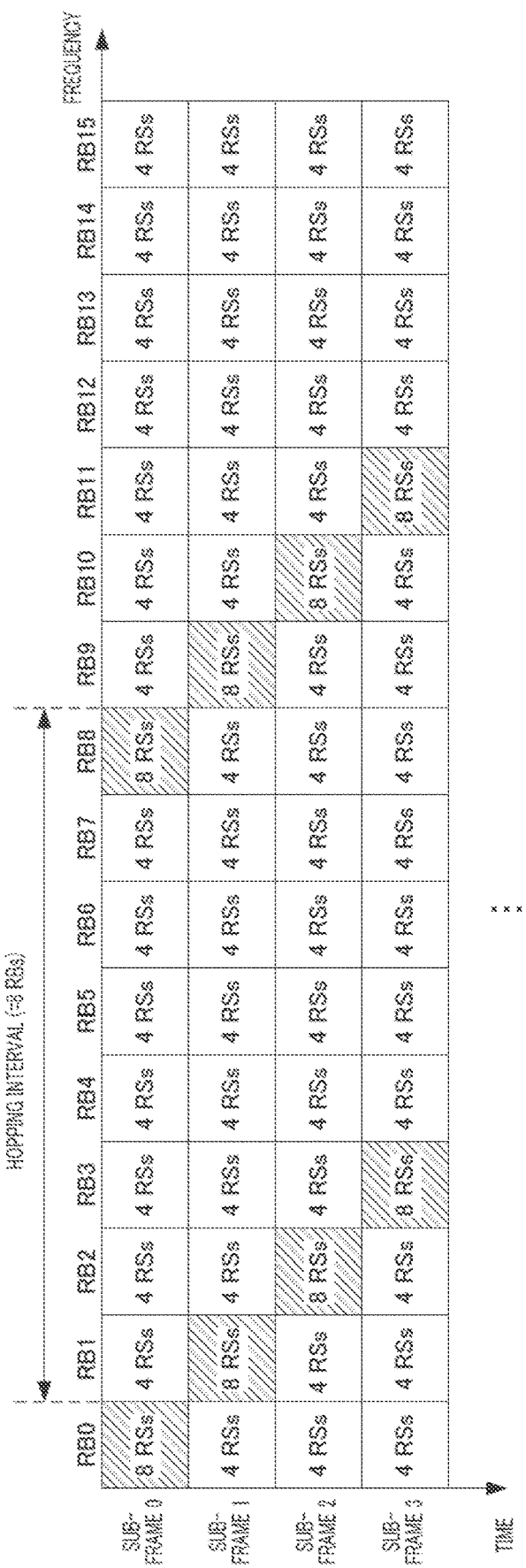
FIG. 17 shows an RS mapping pattern according to Embodiment 4 of the present invention.

As shown in FIG. 17, a case will be described below as an example where the system bandwidth is assumed to be sixteen RBs (RB0 to RB15) as in the case of in FIG. 16. Furthermore, suppose the RB interval in distributed RB allocation is eight RBs.

In the present embodiment, cell-specific RSs used only for LTE+ terminals (R4 to R7) are mapped to two RBs located by an RB interval (eight RBs) away from each other in distributed RB allocation. To be more specific, as shown in FIG. 17, in sub-frame 0, R4 to R7 are mapped to RB0 and RB8 located by eight RBs away from RB0. Similarly, as shown in FIG. 17, R4 to R7 are mapped to RB1 and RB9 located by eight RBs away from RB1 in sub-frame 1, R4 to R7 are mapped to RB2 and RB10 located by eight RBs away from RB2 in sub-frame 2, and R4 to R7 are mapped to RB3 and RB11 located by eight RBs away from RB3.

That is, as shown in FIG. 17, setting section 105 (FIG. 4) of base station 100 sets RB0 and RB8 in sub-frame 0 and sets RB1 and RB9 in sub-frame 1 as RBs to which cell-specific RSs used only for LTE+ terminals (R4 to R7) are mapped. The same applies to sub-frame 2 and sub-frame 3 as well. That is, in each sub-frame, setting section 105 sets two RBs to which cell-specific RSs used only for LTE+ terminals are mapped in RBs located by the same number of RBs as the RB interval (hopping interval) away from each other in distributed RB allocation.

As shown in FIG. 7, mapping section 106 (FIG. 4) of base station 100 maps R4 to R7 to corresponding REs in RB0 (and RB8) of sub-frame 0 and maps R4 to R7 to corresponding REs in RB1 (and RB9) of sub-frame 1. The same applies to sub-frame 2 and sub-frame 3 as well.

As shown in FIG. 17, the number of RBs to which LTE terminals cannot be allocated in each sub-frame through distributed RB allocation (that is, RBs to which cell-specific RSs used only for LTE+ terminals are mapped or RBs whose frequency interval from RB to which cell-specific RSs used only for LTE+ terminals are mapped is eight RBs) is two. That is, while the number of RBs to which cell-specific RSs used only for LTE+ terminals are mapped in each sub-frame is two, the number of RBs to which LTE terminals cannot be allocated through distributed RB allocation is also two.

Thus, cell-specific RSs used only for LTE+ terminals are mapped to a plurality of RBs located by an RB interval away from each other in distributed RB allocation. This causes the number of RBs to which cell-specific RSs used only for LTE+ terminals are mapped to become equal to the number of RBs to which LTE terminals cannot be allocated through distributed RB allocation. That is, base station 100 can minimize the number of RBs to which LTE terminals cannot be allocated. This can minimize scheduling constraints on RBs to which LTE terminals are allocated and prevent deterioration in the throughput of LTE terminals.

By this means, even when allocating terminals to RBs through distributed RB allocation, the present embodiment can prevent deterioration in the throughput of LTE terminals as in the case of Embodiment 1. In particular, distributed RB allocation is mainly used for speech packet transmission. Thus, the present embodiment reduces scheduling constraints on RBs to which LTE terminals are allocated, and can thereby prevent the number of LTE terminals allocated—that is, the number of speech terminals to be accommodated—from reducing in a cell in which LTE terminals performing speech conversation are accommodated.

A case has been described in the present embodiment where cell-specific RSs used only for LTE+ terminals are mapped to a plurality of RBs located by an RB interval away from each other in distributed RB allocation in each sub-frame. However, according to the present invention, cell-specific RSs used only for LTE+ terminals may also be mapped to a plurality of RBs located by 1/N (where, N is a positive integer) of an RB interval away from each other in distributed RB allocation in each sub-frame.

Furthermore, according to 3GPP-LTE, the RB interval (hopping interval) in distributed RB allocation is an integral multiple of the number of RBs, of which an RB group is comprised. Thus, when base station 100 performs distributed RB allocation on terminals in units of RB groups, cell-specific RSs used only for LTE+ terminals may be mapped in units of RB groups in each sub-frame and may be mapped to RB groups located by an RB interval (hopping interval) away from each other in distributed RB allocation.

That is, base station 100 may map cell-specific RSs used only for LTE+ terminals to resource blocks constituting a plurality of RB groups located by an RB interval (hopping interval) away from each other in distributed RB allocation in the same sub-frame in one frame.

Figure 18:
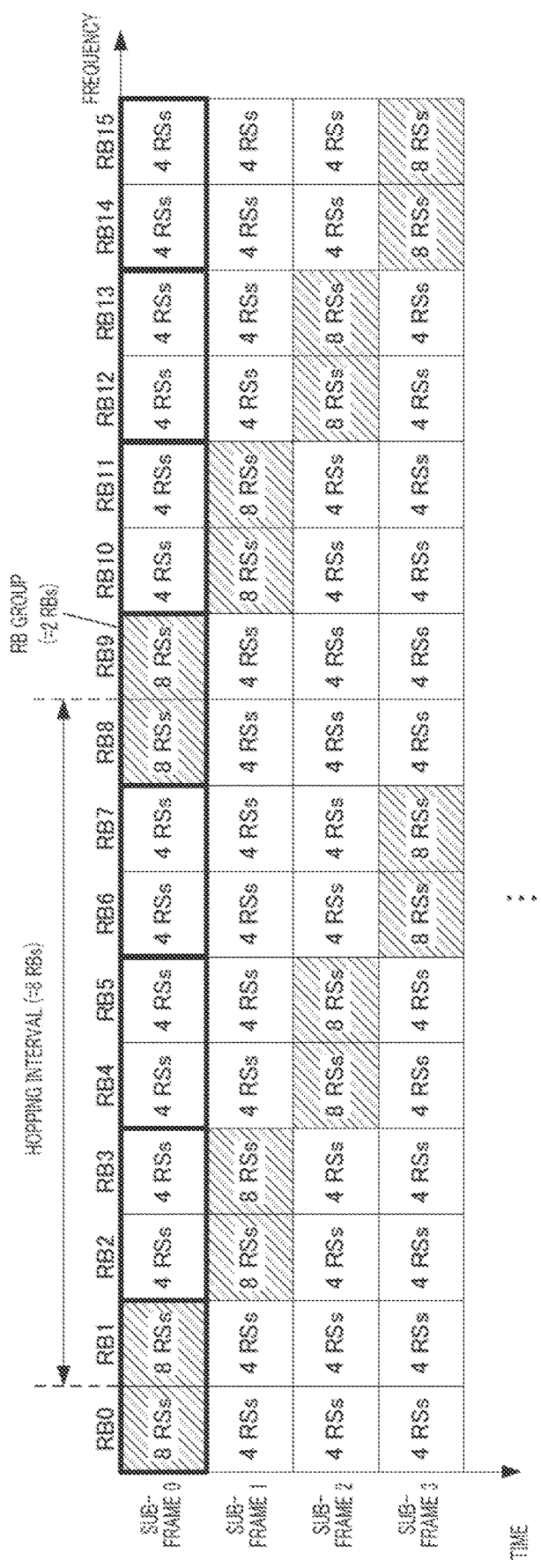
FIG. 18 shows another RS mapping pattern according to Embodiment 4 of the present invention.

Here, FIG. 18 shows an example of RS mapping when cell-specific RSs used only for LTE+ terminals are mapped to RBs shifted by one RB group in the frequency domain every sub-frame in units of RB groups as in the case of Embodiment 3. One RB group is comprised of two RBs (that is, RB group size: two RBs). Furthermore, the RB interval (hopping interval) in distributed RB allocation is assumed to be eight RBs. That is, the RB interval (eight RBs) in distributed RB allocation is four times (an integral multiple of) the RB group size (two RBs).

Thus, as shown in FIG. 18, R4 to R7 are mapped to RB0 and RB1 constituting one RB group in sub-frame 0 and in RB8 and RB9 constituting an RB group located by eight RBs away from the RB group (RB0 and RB1). Similarly, as shown in FIG. 18, R4 to R7 are mapped to RB2 and RB3 constituting one RB group in sub-frame 1 and in RB10 and RB11 constituting an RB group located by eight RBs away from the RB group (RB2 and RB3). The same applies to sub-frame 2 and sub-frame 3 as well.

In the same way as in Embodiment 3, allocating terminals in units of RB groups makes it possible to minimize scheduling constraints on RBs to which LTE terminals are allocated. Furthermore, in the same way as the present embodiment, allocating terminals to RBs through distributed RB allocation makes it possible to minimize scheduling constraints on RBs to which LTE terminals are allocated. That is, the combination between Embodiment 3 and the present embodiment of the present invention is suitable for use in an LTE-advanced system.

Furthermore, by using the RS mapping pattern shown in FIG. 18, it is possible to transmit cell-specific RSs using a format common to a cell accommodating LTE terminals that perform high-speed transmission using RB allocation (type 0 allocation) in units of RB groups and a cell accommodating LTE terminals that perform speech conversation using distributed RB allocation. This makes it possible to realize simplification of the system.

A case has been described in the present embodiment where the number of sub-frames, of which one frame is comprised, is four and a plurality of subcarriers are divided into sixteen RBs in one sub-frame. However, with the present invention, the number of sub-frames, of which one frame is comprised, is not limited to four and the number of RBs into which a plurality of subcarriers are divided in one sub-frame is not limited to sixteen.

Embodiment 5

In mobile communication, HARQ (Hybrid Automatic Repeat reQuest) is applied to a packet (downlink data) transmitted from a base station to a terminal in a downlink and a response signal indicating an error detection result of the packet (downlink data) is fed back to the base station in an uplink. The terminal feeds back an ACK (Acknowledgment) signal when the packet (downlink data) includes no error or an NACK (Negative Acknowledgment) signal when there is some error to the base station as a response signal. When a NACK signal is fed back from the terminal, the base station then retransmits a packet (downlink data)—that is, performs HARQ retransmission.

Furthermore, when a NACK signal is fed back from the terminal, there is synchronous/non-adaptive retransmission in which the base station retransmits a packet (retransmission packet) using the same RBs as those at initial transmission, a predetermined time after receiving the NACK signal. The synchronous/non-adaptive retransmission does not require signaling for notifying retransmission of a packet, and can thereby suppress overhead of a control signal on the retransmission packet.

However, when LTE terminals and LTE+ terminals coexist, although RBs to which cell-specific RSs used for both LTE terminals and LTE+ terminals are mapped are allocated for packets initially transmitted to LTE terminals, RBs to which cell-specific RSs used only for LTE+ terminals are mapped may be allocated upon retransmission, a predetermined time after the initial transmission. In this case, the base station cannot retransmit any retransmission packet to LTE terminals.

Therefore, the present embodiment maps cell-specific RSs used only for LTE+ terminals to each RB (or RB group) at the same time interval (that is, sub-frame interval) as the retransmission interval in HARQ (that is, a predetermined time).

Hereinafter, a cell-specific RS mapping method according to the present embodiment will be described. In the following descriptions, the cell-specific RS mapping pattern set by setting section 105 of base station 100 is different from that of Embodiment 1. Furthermore, suppose the retransmission interval in HARQ (synchronous/non-adaptive retransmission) is four sub-frames. Furthermore, as shown in FIG. 19, cell-specific RSs used only for LTE+ terminals (R4 to R7) are mapped to four RBs (or two RB groups) in the same sub-frame.

Figure 19:
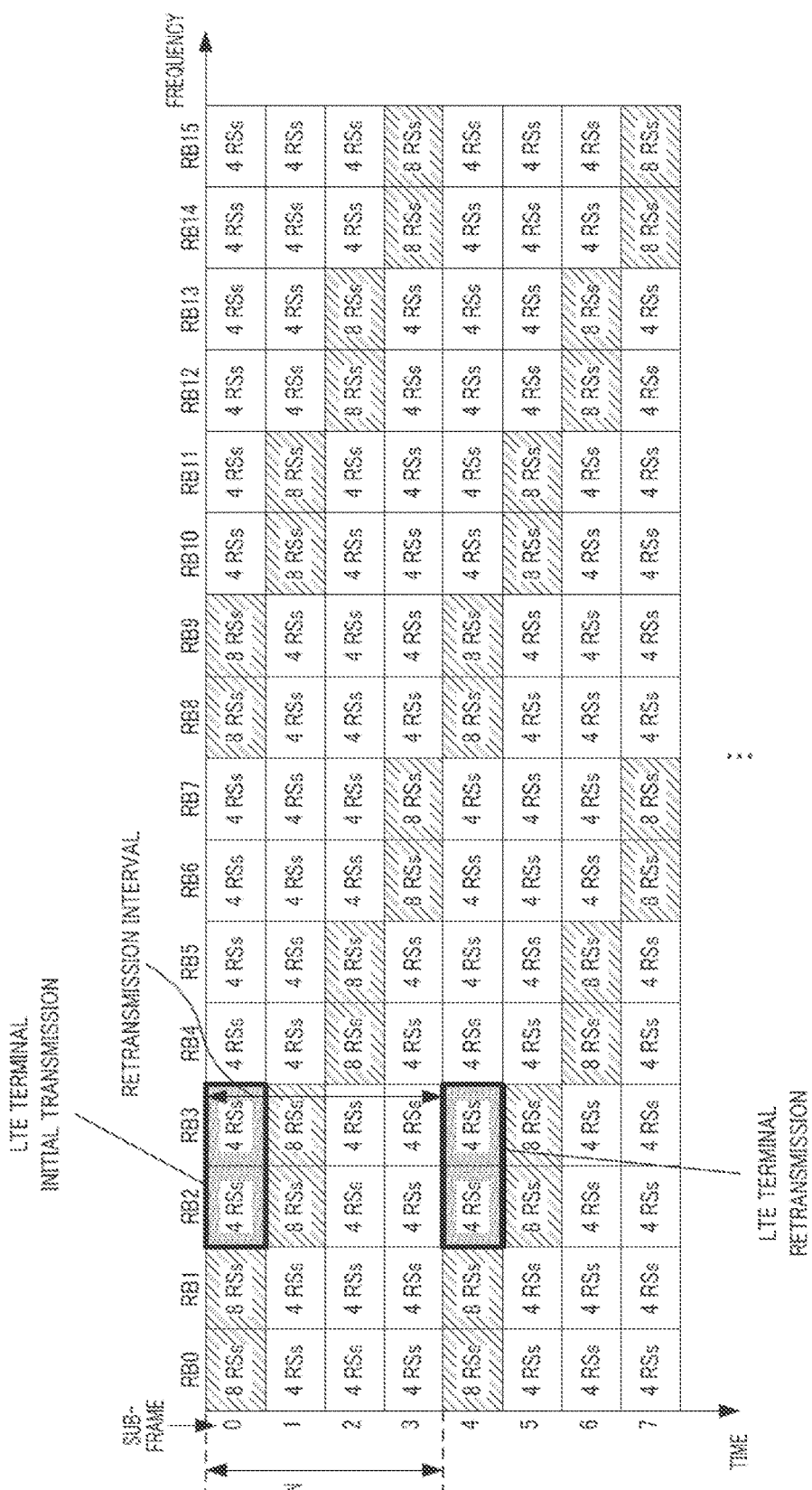
FIG. 19 shows an RS mapping pattern according to Embodiment 5 of the present invention.

Thus, as shown in FIG. 19, R4 to R7 are mapped to RB0, RB1, RB8 and RB9 in sub-frame 0 and sub-frame 4, after four sub-frames (retransmission interval in HARQ) from sub-frame 0. Similarly, as shown in FIG. 19, R4 to R7 are mapped to RB2, RB3, RB10 and RB11 in sub-frame 1 and sub-frame 5, four sub-frames (retransmission interval in HARQ retransmission) from sub-frame 1. The same applies to RB4 to RB7 and RB12 to RB15 as well.

As shown in FIG. 19, cell-specific RSs used only for LTE+ terminals (R4 to R7) are mapped to respective RBs at the same time interval as the retransmission interval in HARQ (that is, retransmission cycle). In other words, cell-specific RSs used only for LTE+ terminals are never mapped to respective RBs in a sub-frame, after a retransmission interval in HARQ from a sub-frame to which cell-specific RSs used for both LTE terminals and LTE+ terminals are mapped. That is, cell-specific RSs used for both LTE terminals and LTE+ terminals are reliably mapped to respective RBs in a sub-frame, after a retransmission interval in HARQ from a sub-frame to which cell-specific RSs used for both LTE terminals and LTE+ terminals are mapped.

Thus, for example, a case is assumed where base station 100 initially transmits packets to LTE terminals using RB2 and RB3 in sub-frame 0 shown in FIG. 19. In this case, even when a NACK signal is fed back from an LTE terminal, base station 100 can reliably retransmit a retransmission packet to the LTE terminal in sub-frame 4, after four sub-frames (retransmission interval in HARQ) from the sub-frame upon initial transmission.

By this means, the present embodiment maps cell-specific RSs used only for LTE+ terminals in respective RBs at the same time interval as the retransmission interval in HARQ (retransmission cycle). This prevents the cell-specific RS mapping from blocking synchronous/non-adaptive retransmission of LTE terminals, and can thereby prevent deterioration in the throughput of LTE terminals.

The retransmission interval in HARQ is the same as the number of HARQ processes. That is, when the retransmission interval in HARQ is eight sub-frames, there are eight HARQ processes per terminal. Therefore, the present invention may assume the time interval at which cell-specific RSs used only for LTE+ terminals are mapped to respective RBs (that is, transmission cycle of cell-specific RSs used only for LTE+ terminals) to be a time interval to match the number of HARQ processes.

Furthermore, the present embodiment has described only first retransmission of a packet. However, even upon second and subsequent retransmissions, the present invention likewise prevents RBs used for retransmission at each retransmission timing from overlapping RBs whereby cell-specific RSs used only for LTE+ terminals are transmitted.

Furthermore, a case has been described in the present embodiment where cell-specific RSs used only for LTE+ terminals are mapped to respective RBs at the same time interval as the retransmission interval in HARQ (transmission cycle). However, according to the present invention, the time interval at which cell-specific RSs used only for LTE+ terminals are mapped to respective RBs may be an integral multiple of the retransmission interval in HARQ (transmission cycle) and may be 1/N (where N is a positive integer) of the retransmission interval in HARQ (transmission cycle). When the time interval at which cell-specific RSs used only for LTE+ terminals are mapped to respective RBs is an integral multiple of the retransmission interval in HARQ, RBs used for retransmission may overlap RBs whereby cell-specific RSs used only for LTE+ terminals are transmitted. However, it is possible to reduce the probability that RBs used for retransmission may overlap RBs whereby cell-specific RSs used only for LTE+ terminals are transmitted.

Furthermore, a case has been described in the present embodiment where the number of sub-frames constituting one frame is eight and a plurality of subcarriers of one sub-frame are divided into sixteen RBs. However, with the present invention, the number of sub-frames, of which one frame is comprised, is not limited to eight and the number of RBs into which a plurality of subcarriers are divided in one sub-frame is not limited to sixteen.

Embodiment 6

In 3GPP-LTE, when feeding back CQIs to the base station, LTE+ terminals report the CQIs in units of sub-bands, each of which bundles a plurality of RBs, in a predetermined cycle (hereinafter, "CQI reporting cycle"). For example, when there are four sub-bands in the system band, an LTE+ terminal reports four CQIs indicating channel quality for respective sub-bands and an average CQI indicating average channel quality for the entire system band to the base station in a CQI reporting cycle.

Furthermore, each LTE+ terminal measures channel quality for each of RBs, of which each sub-band is comprised, using cell-specific RSs used only for LTE+ terminals (R4 to R7) and generates a CQI for the sub-band. That is, in order for the LTE+ terminal to generate a CQI for each sub-band, it is necessary to measure channel quality for all RBs, of which each sub-band is comprised.

Thus, the present embodiment maps cell-specific RSs used only for LTE+ terminals to each RB at the same time interval as the CQI reporting cycle. Furthermore, in each sub-frame, the present embodiment maps cell-specific RSs used only for LTE+ terminals in units of sub-bands.

Figure 20:
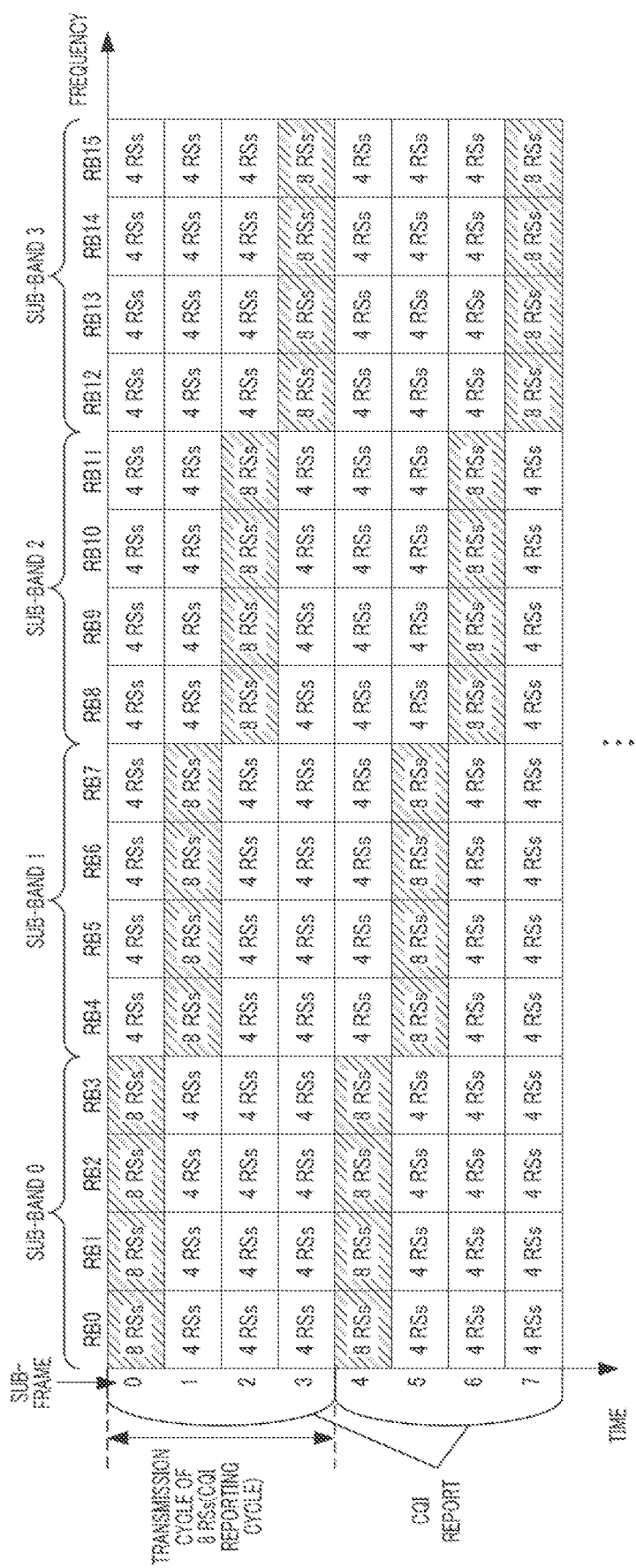
FIG. 20 shows an RS mapping pattern according to Embodiment 6 of the present invention.

Hereinafter, a cell-specific RS mapping method according to the present embodiment will be described. In the following descriptions, a cell-specific RS mapping pattern set by setting section 105 of base station 100 is different from that of Embodiment 1. Furthermore, as shown in FIG. 20, suppose the system band is sixteen RBs (RB0 to RB15) and one sub-band is comprised of four RBs (that is, sub-band size: four RBs). To be more specific, as shown in FIG. 20, sub-band 0 is comprised of RB0 to RB3, sub-band 1 is comprised of RB4 to RB7, sub-band 2 is comprised of RB8 to RB11 and sub-band 3 is comprised of RB12 to RB15. Furthermore, suppose the CQI reporting cycle is four sub-frames.

Thus, as shown in FIG. 20, in RB0 to RB3 constituting sub-band 0, R4 to R7 are mapped in sub-frame 0 and in sub-frame 4, after four sub-frames (CQI reporting cycle) from sub-frame 0. Similarly, as shown in FIG. 20, in RB4 to RB7 constituting sub-band 1, R4 to R7 are mapped in sub-frame 1 and in sub-frame 5, after four sub-frames (CQI reporting cycle) from sub-frame 1. The same applies to RB8 to RB11 constituting sub-band 2 and RB12 to RB15 constituting sub-band 3.

As shown in FIG. 20, in each sub-frame, R4 to R7 are transmitted from base station 100 to LTE+ terminals in units of sub-bands. This allows LTE+ terminals to measure channel quality for all RBs constituting one sub-band in one sub-frame. Furthermore, as shown in FIG. 20, in each sub-band, R4 to R7 are transmitted from base station 100 to LTE+ terminals at intervals of four sub-frames, which is the CQI reporting cycle. That is, the transmission cycle of cell-specific RSs used only for LTE+ terminals in each RB is the same as the CQI reporting cycle. Thus, the LTE+ terminals can measure channel quality for all RBs in all sub-bands 0 to 3 over four sub-frames which correspond to the CQI reporting cycle.

That is, the LTE+ terminals can generate CQIs for four sub-bands 0 to 3 and an average CQI for the entire system band (RB0 to RB15 shown in FIG. 20) in one CQI reporting cycle (4-sub-frame intervals). This allows the LTE+ terminals to report all CQIs for the entire system band in one CQI reporting cycle, thus making it possible to minimize the delay in CQI reporting.

When all CQIs for the entire system band are reported in one CQI reporting cycle, the data size of CQI is greater than that when all CQIs of the entire system band are reported in a plurality of CQI reporting cycles. Here, the greater the encoded data size, the greater is the coding gain. Thus, when the LTE+ terminals report all CQIs in the entire system band in one CQI reporting cycle, the coding gain increases, and coding efficiency of the CQIs thereby improves.

By this means, the present embodiment maps cell-specific RSs used only for LTE+ terminals to each RB at the same time interval as a CQI reporting cycle and maps the cell-specific RSs in units of sub-bands in each sub-frame. This makes it possible to provide similar effects to those of Embodiment 1 and minimize the delay in CQI reporting.

Figure 21:
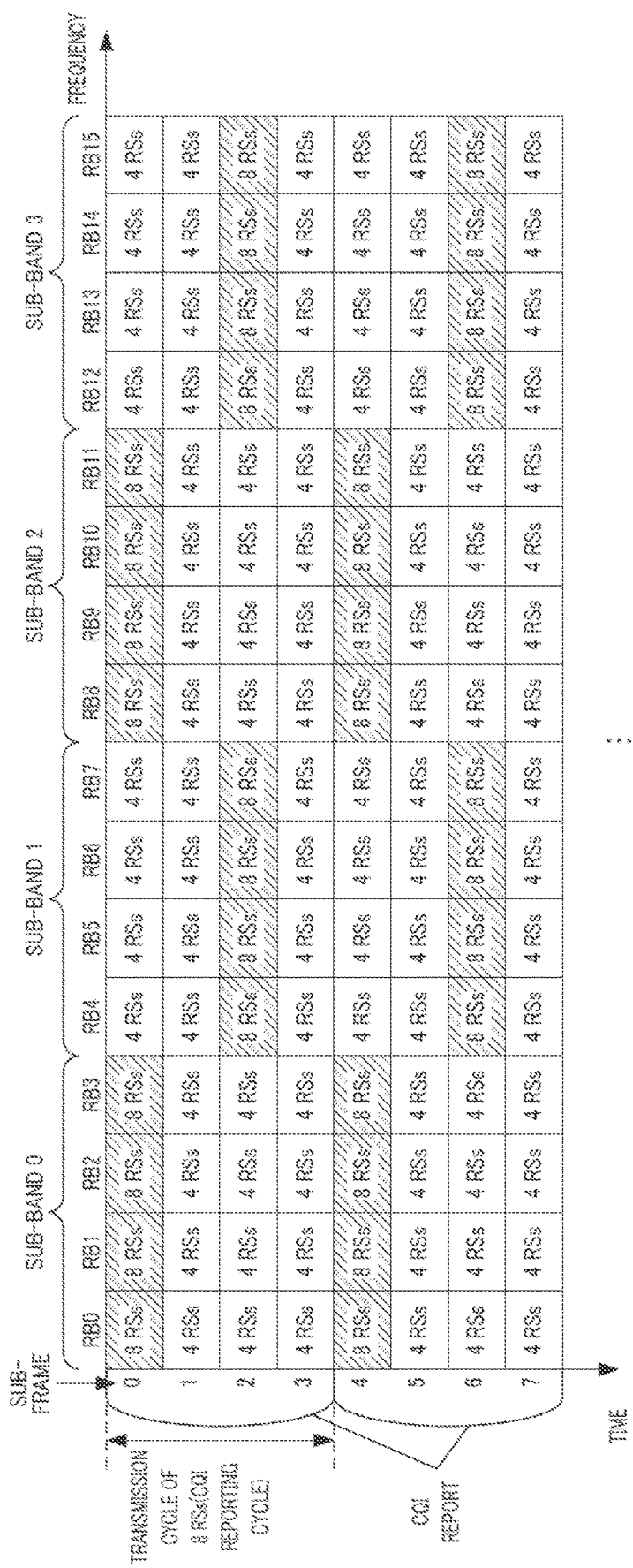
FIG. 21 shows another RS mapping pattern according to Embodiment 6 of the present invention.

With the present invention, cell-specific RSs used only for LTE+ terminals may be mapped in units of sub-bands in each sub-frame and mapped at the same time interval as the CQI reporting cycle to each sub-band. For example, as shown in FIG. 21 instead of FIG. 20, between neighboring sub-bands in the frequency domain, cell-specific RSs used only for LTE+ terminals (R4 to R7) may be mapped to discontinuous RBs and sub-frames in the time domain and frequency domain.

Furthermore, in the present embodiment, when a plurality of CQI reporting cycles are defined and one of the CQI reporting cycles is selected for each terminal, the base station may transmit cell-specific RSs used only for LTE+ terminals in one CQI reporting cycle of the plurality of CQI reporting cycles, for example, in the same transmission cycle (time interval) as the most typical CQI reporting cycle.

Furthermore, according to the present embodiment, the CQI reporting cycle has only to be a cycle in which all CQIs for the sub-bands to be reported are reported, and, for example, LTE+ terminals may report CQIs for respective sub-bands continuously and sequentially in the time domain within the CQI reporting cycle.

Furthermore, a case has been described in the present embodiment where LTE+ terminals report all CQIs generated in their respective sub-bands. However, according to the present invention, LTE+ terminals may also report only CQIs of higher sub-bands having better channel quality among all CQIs generated in the respective sub-bands.

Furthermore, the present invention may also map cell-specific RSs used only for LTE+ terminals in each sub-frame in units of a least common multiple of the number of RBs constituting a sub-band (sub-band size) and the number of RBs constituting an RB group (RB group size). In this case, it is possible to provide similar effects to those of the present embodiment and also provide similar effects to those of Embodiment 3. Here, according to 3GPP-LTE, the sub-band size is an integral multiple of the RB group size. Thus, according to 3GPP-LTE, as described above, if cell-specific RSs used only for LTE+ terminals are mapped in units of sub-bands, cell-specific RSs used only for LTE+ terminals are always mapped in units of a least common multiple of the sub-band size and the RB group size.

Furthermore, a case has been described in the present embodiment where in respective RBs, cell-specific RSs used only for LTE+ terminals are mapped in one sub-frame in a CQI reporting cycle. However, according to the present invention, at each RB, cell-specific RSs used only for LTE+ terminals may also be mapped in a plurality of sub-frames in a CQI reporting cycle. That is, the transmission cycle of cell-specific RSs used only for LTE+ terminals may be faster than the CQI reporting cycle. In this case, in respective RBs, LTE+ terminals can improve the accuracy of CQIs by obtaining an average value of channel quality measured in plurality of sub-frames.

Figure 22:
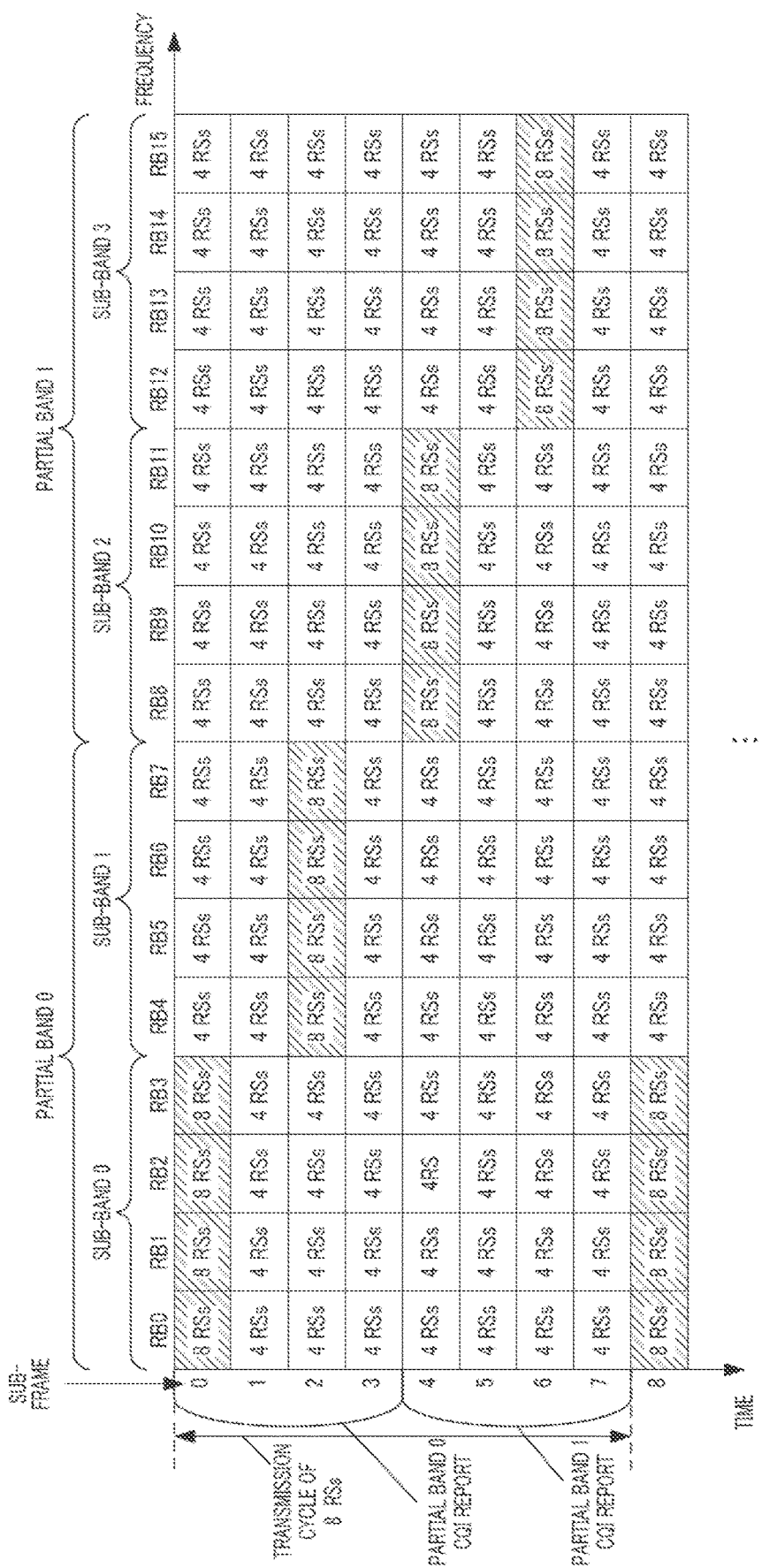
FIG. 22 shows a further RS mapping pattern according to Embodiment 6 of the present invention.

Furthermore, according to 3GPP-LTE, the number of bits of a control signal that can be transmitted in an uplink control channel (e.g. PUCCH (Physical Dedicated Control Channel)) is limited. For this reason, 3GPP-LTE is studying a mode (periodic UE selected sub-band feedback) in which CQIs are reported to the base station one CQI at a time every N sub-frames. Here, suppose the cycle per N sub-frames in which a CQI is reported is a CQI reporting cycle. In this CQI reporting mode, a CQI for the sub-band with the best channel quality in one band (bandwidth part: hereinafter referred to as "partial band") which is one of M portions into which the system band is divided is reported in the CQI reporting cycle. Furthermore, the partial band which is a CQI reporting target in each CQI reporting cycle is shifted every N sub-frames. That is, the sub-frame in which a CQI is measured (CQI measurement sub-frame) differs from one partial band to another. In order to apply the present invention to this CQI reporting mode, cell-specific RSs used only for LTE+ terminals may be mapped in units of sub-bands included in each partial band in each sub-frame and mapped in a cycle M times the CQI reporting cycle (N sub-frames) per partial band ((N×M) sub-frames) in each sub-band. That is, in each RB, the time interval at which cell-specific RSs used only for LTE+ terminals are mapped may be assumed to be M times the CQI reporting cycle in a partial band. For example, FIG. 22 shows an example of RS mapping assuming N=4 and M=2—that is, a case where the CQI reporting cycle per partial band is four sub-frames and the entire system band is divided into partial band 0 and partial band 1. Furthermore, in FIG. 22, sub-frames 0 to 3 are assumed to be CQI measurement sub-frames for partial band 0 and a CQI relating to partial band 0 is reported after a lapse of a predetermined time required for CQI measurement and preparation for transmission. Furthermore, sub-frames 4 to 7 are assumed to be CQI measurement sub-frames for partial band 1 and a CQI relating to partial band 1 is reported after a lapse of a similar predetermined time to that of partial band 0. That is, the CQI reporting cycle is four sub-frames. In this case, as shown in FIG. 22, in partial band 0 (sub-band 0 and sub-band 1), cell-specific RSs used only for LTE+ terminals (R4 to R7) are mapped in sub-frame 0 and sub-frame 2 of sub-frames 0 to 3 which are CQI measurement sub-frames for partial band 0. Furthermore, in partial band 1 (sub-band 2 and sub-band 3), cell-specific RSs used only for LTE+ terminals (R4 to R7) are mapped in sub-frame 4 and sub-frame 6 of sub-frames 4 to 7 which are CQI measurement sub-frames for partial band 1. In sub-frame 8 and subsequent sub-frames shown in FIG. 22, mapping of cell-specific RSs in sub-frames 0 to 7 is repeated. That is, in FIG. 22, in each RB, the time interval at which cell-specific RSs used only for LTE+ terminals are mapped is eight sub-frames which is M (=two partial bands) times CQI reporting cycle N (=four sub-frames) per partial band.

Furthermore, a case has been described in the present embodiment where the number of sub-frames, of which one frame is comprised, is 8 and a plurality of subcarriers are divided into sixteen RBs in one sub-frame. However, according to the present invention, the number of sub-frames, of which one frame is comprised, is not limited to eight and the number of RBs into which a plurality of subcarriers are divided in one sub-frame is not limited to sixteen.

Embodiment 7

In 3GPP-LTE, a base station allocates some LTE terminals to RBs through SPS that continues to use once allocated RBs in a predetermined cycle (time interval). Here, the transmission cycle of RBs to which LTE terminals are allocated by the SPS is called "SPS transmission cycle." By allocating LTE terminals to RBs through SPS, the base station does not have to notify control information indicating an RB allocation result to LTE terminals every time transmission data is transmitted.

However, when LTE terminals and LTE+ terminals coexist, even when transmission data directed to LTE terminals is allocated to RBs to which cell-specific RSs used for both LTE terminals and LTE+ terminals are mapped at a certain transmission timing of the SPS transmission cycle, transmission data directed to LTE terminals may be allocated to RBs to which cell-specific RSs used only for LTE+ terminals are mapped at another transmission timing of the SPS transmission cycle. In this case, the base station cannot further transmit transmission data to LTE terminals allocated through SPS.

Thus, the present embodiment maps cell-specific RSs used only for LTE+ terminals to each RB (or RB group) at a time interval 1/N (where, N is a positive integer) of the SPS transmission cycle.

Hereinafter, a cell-specific RS mapping method of the present embodiment will be described. In the following descriptions, a cell-specific RS mapping pattern set by setting section 105 of base station 100 is different from that of Embodiment 1. Furthermore, suppose the SPS transmission cycle is eight sub-frames. That is, transmission data directed to a terminal allocated through SPS is transmitted every eight sub-frames. Furthermore, as shown in FIG. 23, cell-specific RSs used only for LTE+ terminals (R4 to R7) are mapped to four RBs (or two RB groups) in the same sub-frame.

Figure 23:
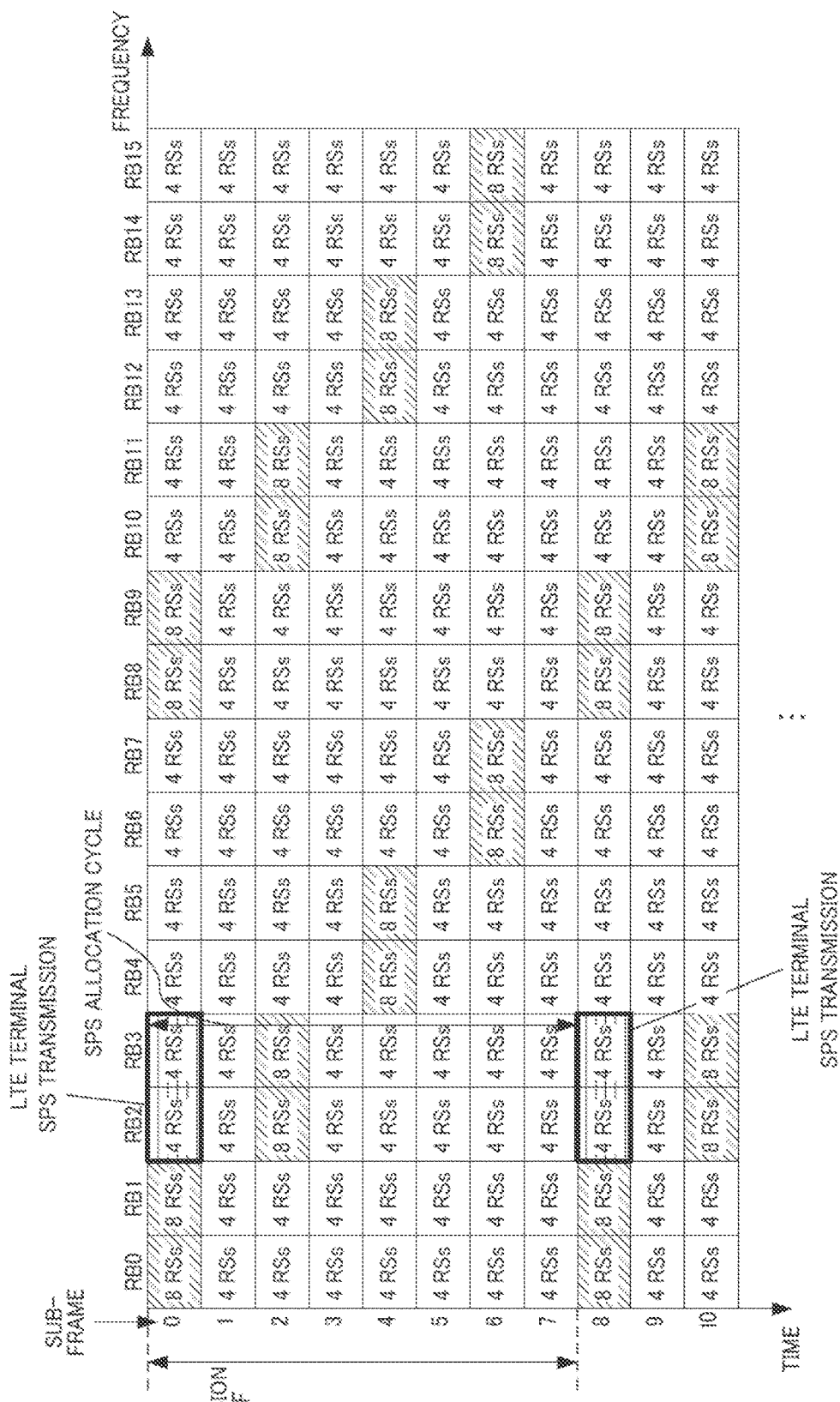
FIG. 23 shows an RS mapping pattern according to Embodiment 7 of the present invention.

Thus, as shown in FIG. 23, R4 to R7 are mapped to RB0, RB1, RB8 and RB9 in sub-frame 0 and sub-frame 8, after eight sub-frames (SPS transmission cycle) from sub-frame 0. Similarly, as shown in FIG. 23, R4 to R7 are mapped to RB2, RB3, RB10 and RB11 in sub-frame 2 and sub-frame 10, after eight sub-frames (SPS transmission cycle) from sub-frame 2. The same applies to RB4 to RB7 and RB12 to RBIS as well.

As shown in FIG. 23, cell-specific RSs used only for LTE+ terminals (R4 to R7) are mapped to each RB at the same time interval as the SPS transmission cycle (eight sub-frames in FIG. 23). In other words, in each RB, cell-specific RSs used only for LTE+ terminals are never mapped in a sub-frame, an SPS transmission cycle after the sub-frame to which cell-specific RSs used for both LTE terminals and LTE+ terminals are mapped. That is, in each RB, cell-specific RSs used for both LTE terminals and LTE+ terminals are reliably mapped in a sub-frame, an SPS transmission cycle after the sub-frame to which cell-specific RSs used for both LTE terminals and LTE+ terminals are mapped.

Thus, for example, if base station 100 transmits transmission data to LTE terminals allocated through SPS using RB2 and RB3 in sub-frame 0 shown in FIG. 23, it is possible to reliably transmit transmission data to LTE terminals from the next SPS transmission timing onward (e.g. sub-frame 8 shown in FIG. 23).

By this means, the present embodiment maps cell-specific RSs used only for LTE+ terminals to each RB at the same time interval as the SPS transmission cycle. This prevents RBs allocated to LTE terminals through SPS from being mixed with RBs to which cell-specific RSs used only for LTE+ terminals are mapped. It is thereby possible to prevent communication quality of LTE terminals allocated through SPS from deteriorating and prevent deterioration in the throughput of LTE terminals.

A case has been described in the present embodiment where cell-specific RSs used only for LTE+ terminals are mapped to each RB at the same time interval (transmission cycle of eight RSs shown in FIG. 23) as the SPS transmission cycle. However, with the present invention, the time interval at which cell-specific RSs used only for LTE+ terminals are mapped to each RB may also be 1/N (e.g. 4-sub-frame intervals or 2-sub-frame intervals in FIG. 23) of the SPS transmission cycle.

Furthermore, a case has been described in the present embodiment where the number of sub-frames, of which one frame is comprised, is eleven and a plurality of subcarriers are divided into sixteen RBs in one sub-frame. However, according to the present invention, the number of sub-frames, of which one frame is comprised, is not limited to eleven and the number of RBs into which the plurality of subcarriers are divided in one sub-frame is not limited to sixteen.

Embodiment 8

In 3GPP-LTE, broadcast information can be classified into three categories based on the way physical resources are used; MIB (Master Information Block), SIB (System Information Block) 1 and SIB 2 to SIB 11 (that is, SIBs from SIB 2 onward).

To be more specific, an MIB is transmitted in a fixed sub-frame (e.g., sub-frame 0) and through P-BCH (Physical Broadcast Channel) using fixed frequency resources. Furthermore, SIB 1 is transmitted in a fixed sub-frame (e.g., sub-frame 5 every two frames). Furthermore, SIBs from SIB 2 onward are transmitted in one of transmittable sub-frames (SI-windows) indicated in scheduling information included in SIB 1. In the case of SIBs from SIB 2 onward, a sub-frame in which the SIBs are transmitted is indicated in a downlink control channel (e.g. PDCCH (Physical Dedicated Control Channel)) notified in the sub-frame. That is, the terminal does not know in which sub-frame SIBs from SIB 2 onward are transmitted until PDCCH is received in the sub-frame. PDCCH also includes information indicating which RBs are used to transmit SIBs from SIB 2 onward.

Here, since the above described broadcast information needs to be received by both LTE terminals and LTE+ terminals, when the broadcast information is transmitted using RBs to which cell-specific RSs used only for LTE+ terminals are mapped, the LTE terminals cannot further receive the broadcast information.

Thus, the present embodiment maps cell-specific RSs used only for LTE+ terminals according to sub-frames and RBs to which broadcast information is allocated.

Hereinafter, a cell-specific RS mapping method according to the present embodiment will be described. In the following descriptions, a cell-specific RS mapping pattern set by setting section 105 of base station 100 is different from that of Embodiment 1.

First, a sub-frame in which MIB or SIB 1 is transmitted will be described.

Figure 24:
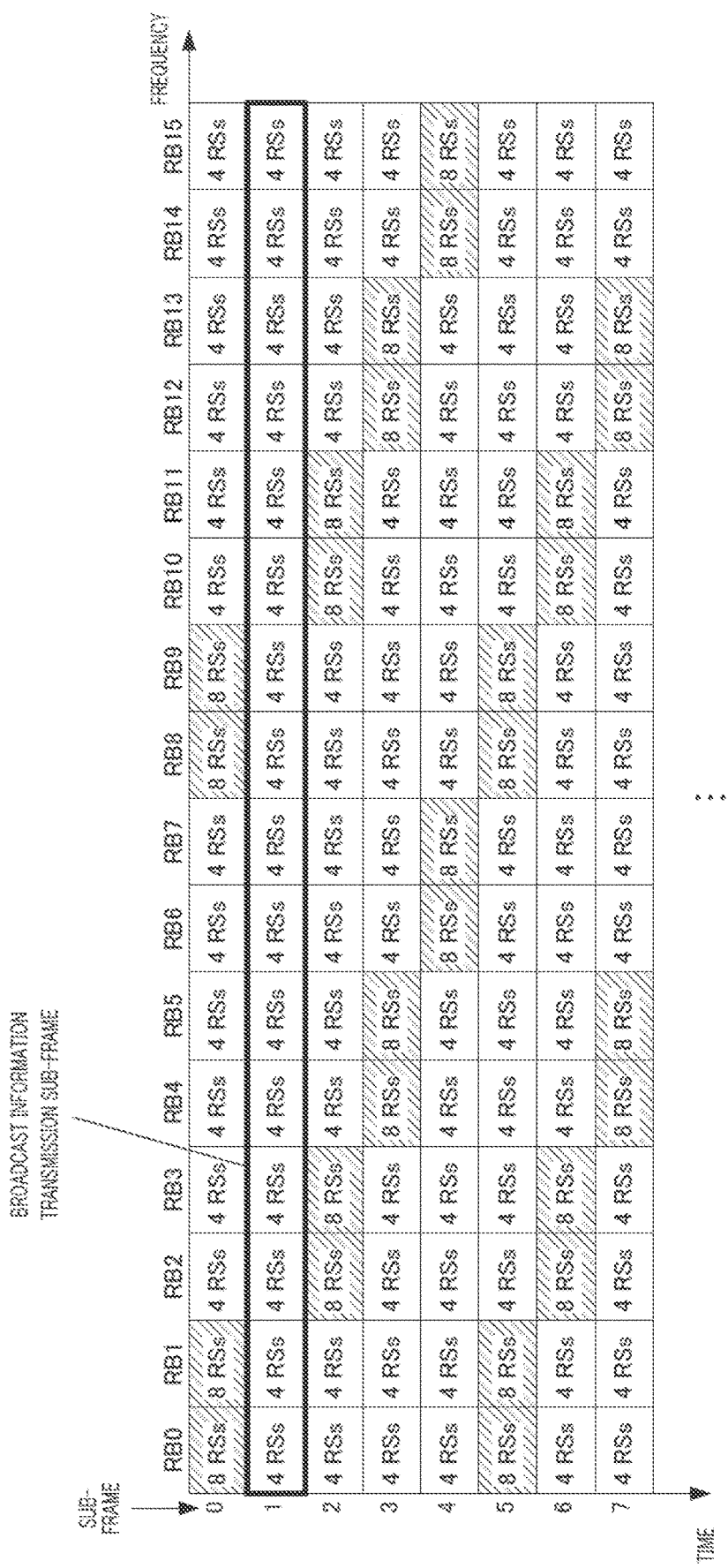
FIG. 24 shows an RS mapping pattern according to Embodiment 8 of the present invention.

Cell-specific RSs used only for LTE+ terminals are not mapped in the sub-frame in which MIB or SIB 1 is transmitted. That is, cell-specific RSs used only for LTE+ terminals are mapped in sub-frames other than the sub-frame in which MIB or SIB1 is transmitted (broadcast information transmission sub-frame). For example, as shown in FIG. 24, when broadcast information (MIB or SIB 1) is transmitted in sub-frame 1, R4 to R7 are mapped in sub-frames other than sub-frame 1—that is, sub-frames 0, 2 to 7 in FIG. 24. That is, R4 to R7 are not mapped in sub-frame 1 shown in FIG. 24. In FIG. 24, R4 to R7 are mapped in RBs shifted two RBs in the frequency domain in sub-frames 0, 2 to 7 other than the sub-frame in which broadcast information is transmitted.

Next, sub-frames in which SIBs from SIB 2 onward are transmitted will be described.

In sub-frames in which SIBs from SIB 2 onward are transmitted, cell-specific RSs used only for LTE+ terminals are mapped to RBs in the same way as, for example, Embodiment 3 (FIG. 15) or Embodiment 4 (FIG. 18). On the other hand, SIBs from SIB 2 onward are transmitted using RBs other than RBs to which cell-specific RSs used only for LTE+ terminals are mapped.

In this way, cell-specific RSs used only for LTE+ terminals are mapped in sub-frames other than the sub-frame in which MIB or SIB 1 is transmitted. Since the sub-frame in which MIB or SIB1 is transmitted is known to LTE+ terminals, the LTE+ terminals may be adapted so as not to perform CQI measurement in the sub-frame in which MIB or SIB1 is transmitted.

Furthermore, since cell-specific RSs used only for LTE+ terminals are not mapped in the sub-frame in which MIB or SIB 1 that needs to be received by both LTE terminals and LTE+ terminals is transmitted, it is possible to secure more RBs that can be used to transmit broadcast information. Thus, base station 100 transmits broadcast information by encoding it at a sufficiently low coding rate in a sub-frame in which broadcast information is transmitted, and can thereby prevent error rate characteristics of the broadcast information from deteriorating.

By contrast, as for SIBs from SIB 2 onward, SIBs from SIB 2 onward are transmitted using RBs other than RBs to which cell-specific RSs used only for LTE+ terminals are mapped. Here, sub-frames in which SIBs from SIB 2 onward are transmitted are unknown to LTE+ terminals. However, according to the present embodiment, LTE+ terminals can perform normal CQI measurement regardless of whether or not the sub-frame is one in which SIBs from SIB 2 onward are transmitted. Therefore, LTE+ terminals do not have to decide whether or not to perform CQI measurement after receiving PDCCH, and can thereby simplify terminal processing and reduce delays. Furthermore, since SIBs from SIB 2 onward are transmitted with RBs to which cell-specific RSs used for both LTE terminals and LTE+ terminals are mapped, LTE terminals can also reliably receive broadcast information.

Sub-frames in which broadcast information (broadcast information SIB+ directed to LTE+ terminals) that needs to be received by only LTE+ terminals, as opposed to the aforementioned broadcast information that needs to be received by both LTE terminals and LTE+ terminals, is transmitted are known to LTE+ terminals. Furthermore, the mapping of cell-specific RSs used only for LTE+ terminals is also known to LTE+ terminals. Thus, when broadcast information SIB+ directed to LTE+ terminals is transmitted, it is not necessary to provide constraints on sub-frames (or RBs) to which cell-specific RS are mapped and sub-frames (or RBs) in which SIB+ is transmitted.

Thus, according to the present embodiment, both LTE terminals and LTE+ terminals can reliably receive broadcast information and can also prevent error rate characteristics of broadcast information from deteriorating in sub-frames in which the broadcast information is transmitted.

A case has been described in the present embodiment where SIBs from SIB 2 onward are transmitted using RBs other than RBs to which cell-specific RSs used only for LTE+ terminals are mapped. However, according to the present invention, SIBs from SIB 2 onward may also be transmitted, for example, in sub-frames other than sub-frames to which cell-specific RSs used only for LTE+ terminals are mapped. Alternatively, cell-specific RSs used only for LTE+ terminals may also be mapped in sub-frames other than sub-frames in which SIBs from SIB 2 onward are transmitted based on an SI-window notified with SIB 1.

Figure 25:
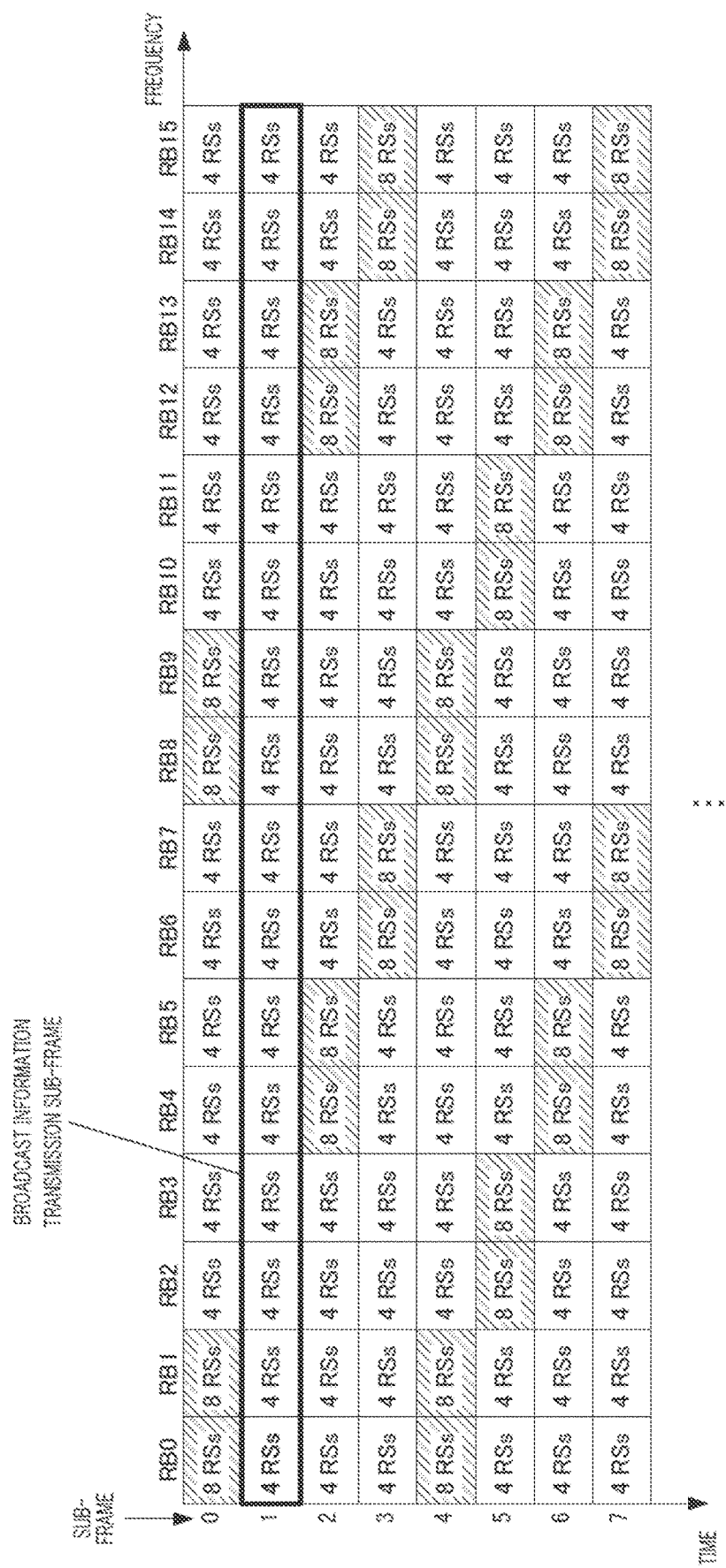
FIG. 25 shows another RS mapping pattern according to Embodiment 8 of the present invention.

Furthermore, a case has been described in the present embodiment where as shown in FIG. 24, cell-specific RSs used only for LTE+ terminals are mapped to RBs shifted every sub-frame not including a sub-frame in which broadcast information is transmitted (sub-frame 1 in FIG. 24). That is, a case has been described where cell-specific RSs used only for LTE+ terminals are mapped to RBs shifted by two RBs in the frequency domain in sub-frames 0, 2 to 7 shown in FIG. 24. However, according to the present invention, as shown in FIG. 25, cell-specific RSs used only for LTE+ terminals may also be mapped to RBs shifted in the frequency domain every sub-frame including a sub-frame in which broadcast information is transmitted (sub-frame 1 in FIG. 25). However, cell-specific RSs used only for LTE+ terminals are not mapped in a sub-frame in which broadcast information is transmitted. To be more specific, cell-specific RSs used only for LTE+ terminals are mapped to RBs shifted by two RBs in the frequency domain in sub-frames 0 to 7 shown in FIG. 25. However, cell-specific RSs used only for LTE+ terminals are not mapped to RB2 and RB3 (RB10 and RB11) of sub-frame 1 in which broadcast information is transmitted. In this way, even when the sub-frame in which broadcast information is transmitted differs from one cell to another, RBs to which cell-specific RSs used only for LTE+ terminals are mapped are the same between the cells. Furthermore, RBs to which cell-specific RSs used only for LTE+ terminals are mapped become constant in a specific cycle regardless of the presence or absence of broadcast information. Thus, in the same way as the present embodiment, LTE+ terminals located in each cell do not measure CQI in a sub-frame in which broadcast information is transmitted, and the circuit necessary for CQI measurement of LTE+ terminals can be simplified. Furthermore, to avoid interference between RSs between cells, when cell-specific RSs used only for LTE+ terminals are mapped to different RBs between cells, the relationship between RBs to which cell-specific RSs used only for LTE+ terminals are mapped (mapping relationship of RBs to avoid interference) is maintained between cells regardless of the presence or absence of broadcast information. This prevents the interference reduction effect from deteriorating.

Furthermore, according to the present embodiment, the mapping of cell-specific RSs used only for LTE+ terminals may be avoided not only in MIB and SIB1 to SIB11 but also in sub-frames (MBSFN sub-frame) in which, for example, MBSFN (MBMS Single Frequency Network) data is transmitted. That is, cell-specific RSs used only for LTE+ terminals may be mapped in sub-frames other than MBSFN sub-frames.

Furthermore, a case has been described in the present embodiment where the number of sub-frames, of which one frame is comprised, is 8 and a plurality of subcarriers are divided into sixteen RBs in one sub-frame. However, with the present invention, the number of sub-frames, of which one frame is comprised, is not limited to eight and the number of RBs into which a plurality of subcarriers are divided in one sub-frame is not limited to sixteen.

Embodiments of the present invention have been described so far.

According to the present invention, transmission power of cell-specific RSs used only for LTE+ terminals (R4 to R7) among cell-specific RSs (R0 to R7) may be smaller than transmission power of cell-specific RSs (R0 to R3) used for both LTE terminals and LTE+ terminals. Terminals (LTE terminals and LTE+ terminals) from which the base station receives transmission signals using four antennas are assumed to be located in the entire cell. On the other hand, LTE+ terminals from which the base station receives high-speed transmission signals using eight antennas are assumed to be located near the center of the cell where channel quality is good. For this reason, the base station transmits cell-specific RSs used only for LTE+ terminals (R4 to R7) with smaller transmission power than transmission power of cell-specific RSs (R0 to R3) used for both LTE terminals and LTE+ terminals, and can thereby improve transmission efficiency of RSs. Furthermore, according to the present invention, the number of RS symbols per RB of cell-specific RSs used only for LTE+ terminals (R4 to R7) among cell-specific RSs (R0 to R7) (that is, RS mapping density) may be lower than the mapping density of cell-specific RSs (R0 to R3) used for both LTE terminals and LTE+ terminals.

The above embodiments have described a communication system in which LTE terminals and LTE+ terminals coexist. However, the present invention is applicable not only to a communication system in which LTE terminals and LTE+ terminals coexist but is also applicable to a communication system in which terminals corresponding to only a base station provided with, for example, N antennas and terminals corresponding to a base station provided with more than N antennas coexist. Furthermore, the present invention is also applicable to a case where terminal 1 operating, for example, on communication system A, and terminal 2 operating only on communication system B which is an older version than communication system A on which terminal 1 is operating coexist.

Furthermore, a case has been described in the above embodiments where R0 to R3 are RSs transmitted from antennas 0 to 3 (first to fourth antennas) provided for a 4Tx base station or 8Tx base stations and R4 to R7 are RSs transmitted from antennas 4 to 7 (fifth to eighth antennas) provided for an 8Tx base station. However, R0 to R3 with the present invention have only to be RSs received by LTE terminals and LTE+ terminals and R4 to R7 need only to be RSs received only by LTE+ terminals. For example, R4 to R7 may be RSs transmitted to an LTE+ terminal from another base station that performs coordinated transmission or a relay station.

Furthermore, the present invention is also applicable to a case where the number of antennas is equal to or more than five and less than eight in an 8Tx base station provided eight antennas—that is, when only part of RSs, R4 to R7, are transmitted as in the case of the above embodiments.

Furthermore, a case has been described in the above embodiments where cell-specific RSs used only for LTE+ terminals are mapped to RBs shifted in the frequency domain every sub-frame. However, according to the present invention, cell-specific RSs used only for LTE+ terminals may also be mapped to RBs not shifted in the frequency domain every sub-frame—that is, may be mapped to fixed RBs in any sub-frame.

Furthermore, a case has been described in the above embodiments where the base station does not allocate LTE terminals to RBs to which cell-specific RSs used only for LTE+ terminals are mapped. Here, when the base station allocates LTE terminals to RBs to which cell-specific RSs used only for LTE+ terminals are mapped, LTE terminals receive cell-specific RSs used only for LTE+ terminals as data directed to the LTE terminals and the reception performance deteriorates. However, according to the present invention, when the performance deterioration with respect to the LTE terminals is in an allowable range, the base station may allocate LTE terminals to RBs to which cell-specific RSs used only for LTE+ terminals are mapped.

Furthermore, the terminal may also be referred to as "UE," the base station may also be referred to as "Node B," and the subcarrier may also be referred to as "tone." Furthermore, a CP may also be referred to as "guard interval (GI)". Furthermore, cell-specific RSs may also be referred to as "common RSs." Furthermore, a reference signal may also be referred to as "pilot signal." Furthermore, a sub-frame may also be referred to as "slot."

Furthermore, an antenna may also be referred to as "antenna port." A plurality of physical antennas may be used as one antenna port. An "antenna port" means a theoretical antenna comprised of one or a plurality of physical antennas. That is, the antenna port does not necessarily refer to one physical antenna but may refer to an array antenna comprised of a plurality of antennas. For example, 3GPP-LTE does not define the number of physical antennas of which the antenna port is comprised, but defines the antenna port as a minimum unit whereby the base station can transmit different reference signals. Furthermore, the antenna port may be defined as a minimum unit whereby a precoding vector weight is multiplied. For example, a base station provided with eight physical antennas (physical antennas 0 to 7) transmits R0 with a weight (e.g. weighting factor (1, 1)) assigned thereto at physical antennas 0 and 4 and transmits R4 with a weight orthogonal to the weight of R0 (e.g. weighting factor (1, −1)) assigned thereto. Similarly, physical antennas 1 and 5 transmit R1 with a weight (e.g. weighting factor (1, 1)) assigned thereto and transmit R5 with a weight orthogonal to the weight of R1 (e.g. weighting factor (1, −1)) assigned thereto. Furthermore, physical antennas 2 and 6 transmit R2 with a weight (e.g. weighting factor (1, 1)) assigned thereto and transmit R6 with a weight orthogonal to the weight of R2 (e.g. weighting factor (1, −1)) assigned thereto. Furthermore, physical antennas 3 and 7 transmit R3 with a weight (e.g. weighting factor (1, 1)) assigned thereto and transmit R7 with a weight orthogonal to the weight of R1 (e.g. weighting factor (1, −1)) assigned thereto. This allows LTE+ terminals to separate respective propagation paths from physical antennas 0 and 4 to the LTE+ terminals using R0 and R4 and perform channel estimation. Similarly, the LTE+ terminals can separate respective propagation paths from physical antennas 1 and 5 to the LTE+ terminals using R1 and R5 and perform channel estimation, separate respective propagation paths from physical antennas 2 and 6 to the LTE+ terminals using R2 and R6 and separate respective propagation paths from physical antennas 3 and 7 to the LTE+ terminals using R3 and R7 and perform channel estimation. That is, the base station transmits two cell-specific RSs with weights orthogonal to each other assigned thereto from two physical antennas. Using such an RS transmission method, the present invention can also provide similar effects to those of the above embodiments.

Although a case has been described in the above embodiments where LTE+ terminals use high-order MIMO (8-antenna MIMO), the present invention is not limited to this, but the present invention is also applicable to a case where the receiving side (LTE+ terminal) receives reference signals for more antennas than those of 3GPP-LTE, for example, an operation of receiving reference signals transmitted form a plurality of base stations. For example, one base station comprises eight antennas in the above embodiments, whereas the present invention is also applicable to a configuration in which a plurality of base stations configure eight antennas. The above embodiments have described 3GPP-LTE as having four antennas and high-order MIMO as having a total of eight antennas with four antennas further added to 3GPP-LTE as an example. However, the present invention is not limited to this, but 3GPP-LTE may have two antennas and high-order MIMO may have a total of four antennas with two antennas further added to 3GPP-LTE. Alternatively, the above two may be combined; 3GPP-LTE may be configured from two antennas or four antennas and high-order MIMO may be configured from two antennas or four antennas added to 3GPP-LTE. Alternatively, 3GPP-LTE may be configured from two antennas and high-order MIMO may be configured from a total of eight antennas with six antennas further added to 3GPP-LTE.

Furthermore, when the concept of an antenna port is used, even if there are actually eight physical antennas, four antenna ports may be defined for cell-specific RSs (cell-specific RSs used for both LTE terminals and LTE+ terminals) directed to 3GPP-LTE and other eight antenna ports may be defined for cell-specific RSs (cell-specific RSs used only for LTE+ terminals) directed to high-order MIMO. In this case, for example, the base station may transmit cell-specific RSs directed to 3GPP-LTE with weights assigned thereto by two physical antennas per antenna port and transmit cell-specific RSs directed to high-order MIMO without weighting from each antenna.

Furthermore, cell-specific RSs may also be defined as RSs used to demodulate broadcast information (PBCH) or PDCCH of the cell, and terminal-specific RSs may also be defined as RSs used to demodulate transmission data directed to terminals.

Furthermore, the method of realizing conversion between the frequency domain and time domain is not limited to IFFT or FFT.

Furthermore, the present invention is applicable not only to the base station and terminals but also to all radio communication apparatuses.

The present invention has been described as an antenna in the above embodiments, but the present invention is likewise applicable to an antenna port.

The antenna port refers to a theoretical antenna comprised of one or a plurality of physical antennas. That is, the antenna port does not necessarily refer to one physical antenna, but may refer to an array antenna comprised of a plurality of antennas.

For example, 3GPP-LTE does not define the number of physical antennas of which the antenna port is comprised, but defines the antenna port as a minimum unit whereby the base station can transmit different reference signals.

Furthermore, the antenna port may be defined as a minimum unit whereby a precoding vector weight is multiplied.

Furthermore, CQI and PMI may be jointly referred to as "CSI (Channel State Information)." Cell-specific RSs used only for LTE+ terminals in the above embodiments are intended to measure CQI and PMI, and may therefore be called "CSI-RS."

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-018284, filed on Jan. 29, 2009, including the specification, drawings and abstract, is incorporated herein by reference in its entirety.

INDUSTRIAL APPLICABILITY

The present invention is applicable to a mobile communication system or the like.

The invention claimed is:

1. A communication apparatus comprising:
   circuitry, which, in operation, maps a first reference signal in a subframe, and maps a second reference signal in all downlink subframes, the first reference signal being used for computing a channel quality indicator (CQI) by a terminal compliant with a first communication system, and the second reference signal being used for computing a CQI by the terminal and another terminal compliant with a second communication system; and
   a transmitter, which, in operation, transmits the first reference signal to the terminal, and transmits the second reference signal to the terminal and the other terminal,
   wherein the first reference signal is mapped in a same period as a period of semi-persistent scheduling (SPS) transmission, or in a period which is 1/N of the period of the SPS transmission, where N is a positive integer.

2. The communication apparatus according to claim 1, wherein said circuitry, in operation, maps a third reference signal for demodulating data on a resource block upon which the data is mapped, and said transmitter, in operation, transmits the third reference signal to the terminal.

3. The communication apparatus according to claim 2, wherein the third reference signal is a UE-specific reference signal.

4. The communication apparatus according to claim 1, wherein the second reference signal is a cell-specific reference signal.

5. The communication apparatus according to claim 1, wherein the second reference signal is used for demodulating a Physical Broadcast Channel (PBCH) or a downlink control channel.

6. The communication apparatus according to claim 1, wherein the circuitry, in operation, maps the first reference signal and the second reference signal such that a number of symbols of the first reference signal per resource block is less than a number of symbols of the second reference signal per resource block.

7. The communication apparatus according to claim 1, wherein a maximum number of antenna ports of a base station compliant with the first communication system is greater than a maximum number of antenna ports of a base station compliant with the second communication system.

8. The communication apparatus according to claim 1, wherein the first communication system is an LTE-Advanced system, and the second communication system is an LTE system.

9. The communication apparatus according to claim 1, wherein the circuitry, in operation, maps the first reference signal in a set period.

10. The communication apparatus according to claim 1, wherein the circuitry, in operation, maps the first reference signal in a same period as a period in which the CQI is reported, or in a period which is an integer multiple of the period in which the CQI is reported.

11. The communication apparatus according to claim 1, wherein the first reference signal is a cell-specific reference signal.

12. The communication apparatus according to claim 1, wherein the first reference signal is a channel state information-reference signal (CSI-RS).

13. A communication method comprising:
   mapping a first reference signal in a subframe;
   mapping a second reference signal in all downlink subframes, the first reference signal being used for computing a channel quality indicator (CQI) by a terminal compliant with a first communication system, and the second reference signal being used for computing a CQI by the terminal and another terminal compliant with a second communication system; and
   transmitting the first reference signal to the terminal, and transmitting the second reference signal to the terminal and the other terminal,
   wherein the first reference signal is mapped in a same period as a period of semi-persistent scheduling (SPS) transmission, or in a period which is 1/N of the period of the SPS transmission, where N is a positive integer.

* * * * *